US008602497B2

(12) United States Patent
Zhang et al.

(10) Patent No.: US 8,602,497 B2
(45) Date of Patent: Dec. 10, 2013

(54) ROTARY RECLINER MECHANISM

(75) Inventors: Xinhui Zhang, Canton, MI (US); Karl G. Sponsler, Canton, MI (US); Anmol Bhate, Issaquah, WA (US)

(73) Assignee: Johnson Controls Technology Company, Holland, MI (US)

( * ) Notice: Subject to any disclaimer, the term of this patent is extended or adjusted under 35 U.S.C. 154(b) by 791 days.

(21) Appl. No.: 12/445,024

(22) PCT Filed: Oct. 11, 2007
(Under 37 CFR 1.47)

(86) PCT No.: PCT/US2007/081110
§ 371 (c)(1),
(2), (4) Date: Aug. 11, 2010

(87) PCT Pub. No.: WO2008/046004
PCT Pub. Date: Apr. 17, 2008

(65) Prior Publication Data
US 2011/0181088 A1    Jul. 28, 2011

Related U.S. Application Data

(60) Provisional application No. 60/851,148, filed on Oct. 12, 2006, provisional application No. 60/878,765, filed on Jan. 5, 2007.

(51) Int. Cl.
*B60N 2/235* (2006.01)
(52) U.S. Cl.
USPC ........................................................ 297/367 R
(58) Field of Classification Search
USPC ........................................................ 297/367 R
See application file for complete search history.

(56) References Cited

U.S. PATENT DOCUMENTS 5,590,931 A    1/1997  Fourrey et al.
6,092,874 A    7/2000  Kojima et al.
(Continued)

FOREIGN PATENT DOCUMENTS

CN    11177539 C    8/2003
EP    0 773 133 A2    5/1997
(Continued)

OTHER PUBLICATIONS

The PCT Search Report dated Mar. 18, 2008 for corresponding PCT Application No. PCT/US2007/081110 (2 pgs.).
(Continued)

*Primary Examiner* — Anthony D Barfield
(74) *Attorney, Agent, or Firm* — Foley & Lardner LLP

(57) ABSTRACT

A recliner mechanism (10) includes a first member (40) rotatably supported with respect to a second member (60). The recliner mechanism (10) also includes at least one locking arm member (140) movably located between the first and second members. The locking arm member is configured to lock the position of the first and second members with respect to one another. The recliner mechanism further includes an inner ring member for establishing the range of relative motion between the first and second members. The inner ring member is located on either the first or second member. The recliner mechanism further includes at least one disc member (200) located between the locking arm member and a cam member (180). Actuating the cam member engages or disengages the locking arm member to lock and unlock the first and second members. The first and second members have a plurality of stop members formed therein for engagement with a portion of the inner ring member to define the limits of travel of the recliner mechanism.

29 Claims, 15 Drawing Sheets

(56) References Cited

U.S. PATENT DOCUMENTS

| | | |
|---|---|---|
| 6,318,805 B1 | 11/2001 | Asano |
| 6,390,557 B1 * | 5/2002 | Asano .................. 297/367 R X |
| 6,758,525 B2 * | 7/2004 | Uramichi .............. 297/367 R X |
| 7,188,905 B2 * | 3/2007 | Ham ..................... 297/367 R X |
| 2005/0146187 A1 | 7/2005 | Volker et al. |

FOREIGN PATENT DOCUMENTS

| | | |
|---|---|---|
| EP | 0 773 133 B1 | 5/1997 |
| JP | 08-214978 A | 8/1996 |
| JP | 2002-101995 A | 4/2002 |
| JP | 2005-280702 A | 10/2005 |

OTHER PUBLICATIONS

Chinese Office Action dated Dec. 9, 2010, as received in related application, CN 200780045159.3.

The International Preliminary Report on Patentability for corresponding PCT Application No. PCT/US2007/081110 (8 pages).

CN Office Action dated Apr. 1, 2012 as received in Chinese Patent Application No. 200780045159.3, 7 pages.

English Translation of First Office Action of the Russian Patent Office dated Oct. 26, 2011 as received in corresponding Russian Patent Application No. 2009 115 965, 5 pages.

Mexican Office Action dated Nov. 17, 2011 as received in corresponding Mexican Patent Application No. MX/a/2009/003712, 3 pages.

Communication from the European Patent Office received in connection with related application No. EP 07853952.5-2424, dtd Sep. 13, 2012.

Communication from the Japanese Patent Office received in connection with related application No. JP 2009-532578 dtd Nov. 6, 2012.

* cited by examiner

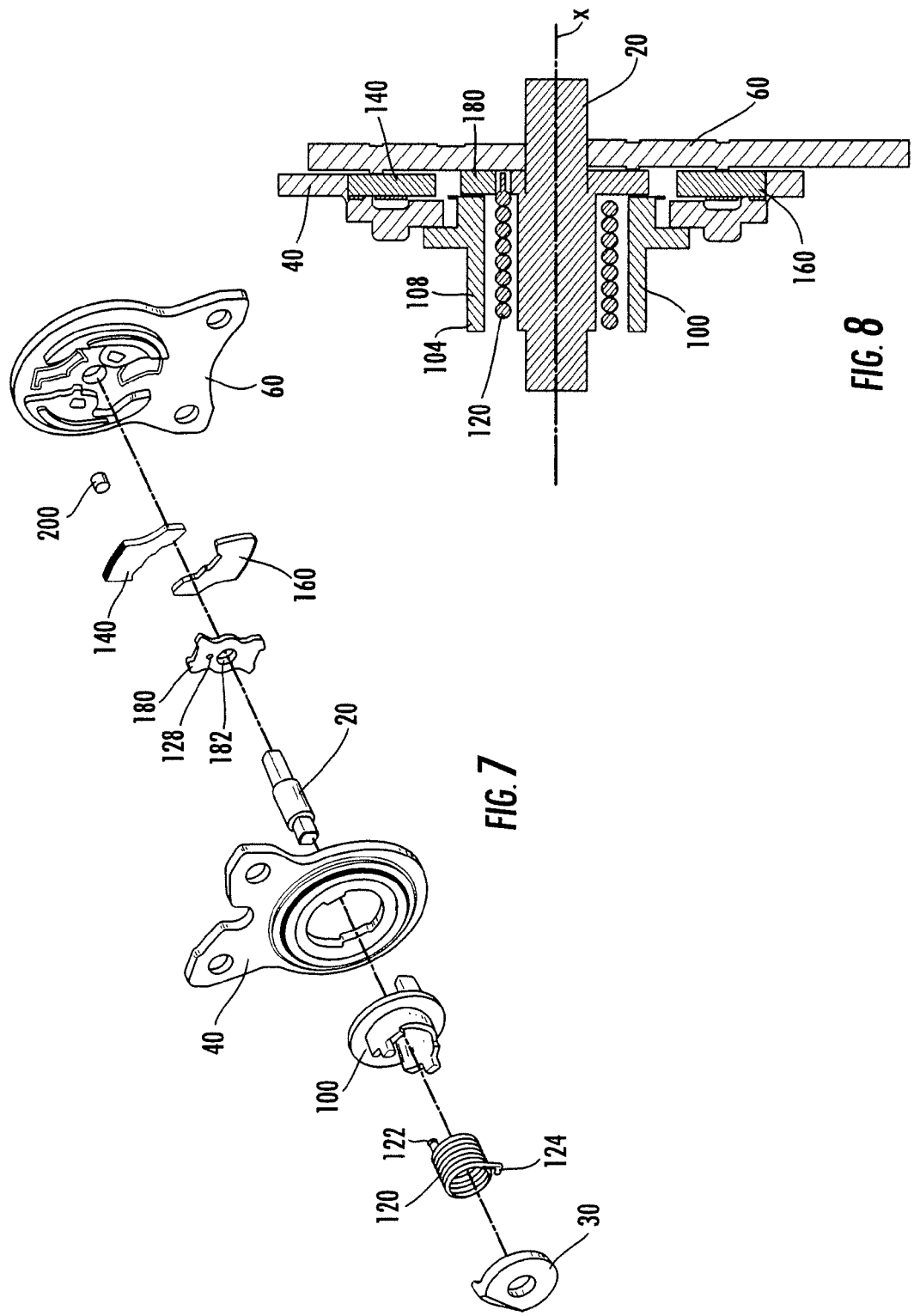

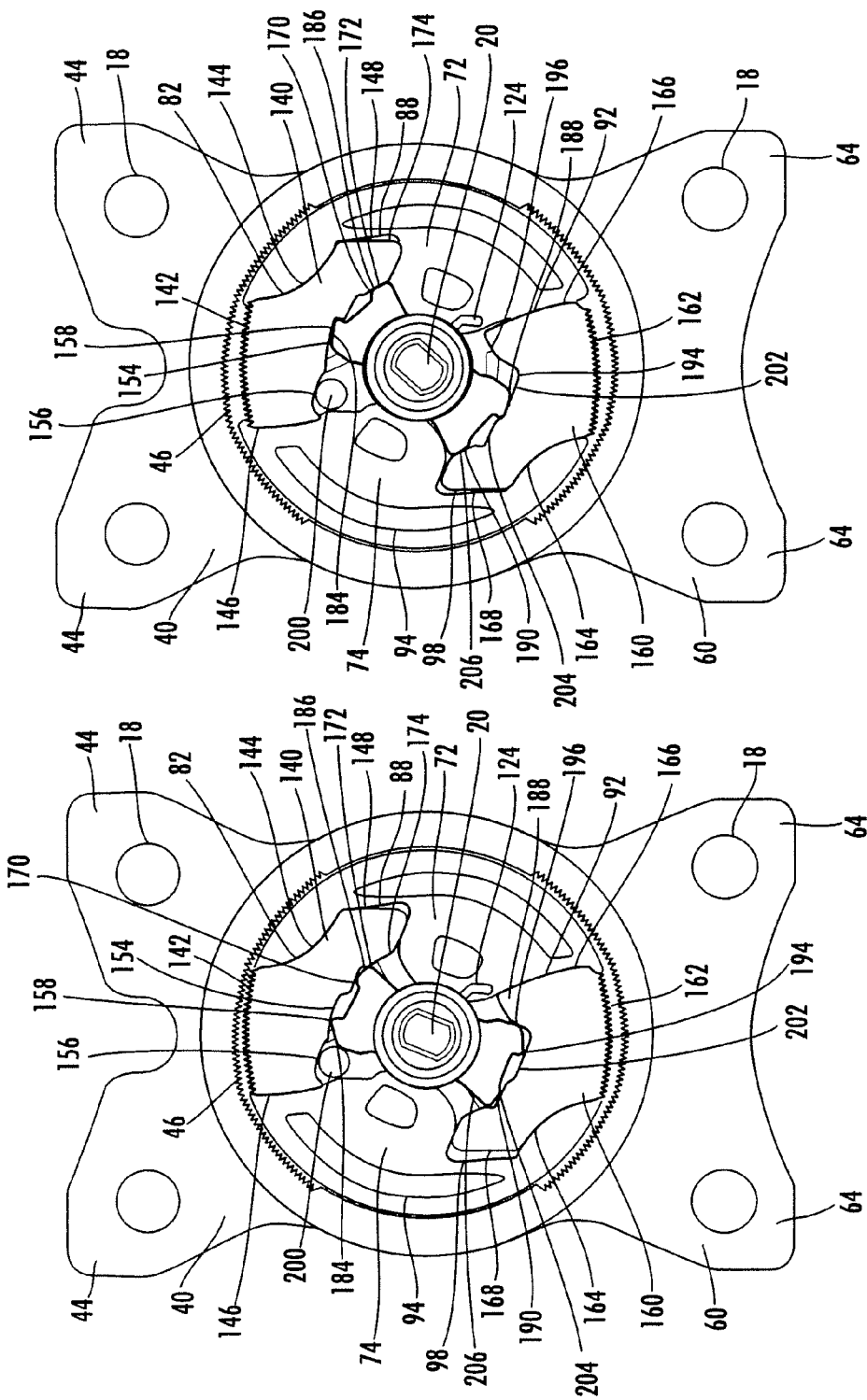

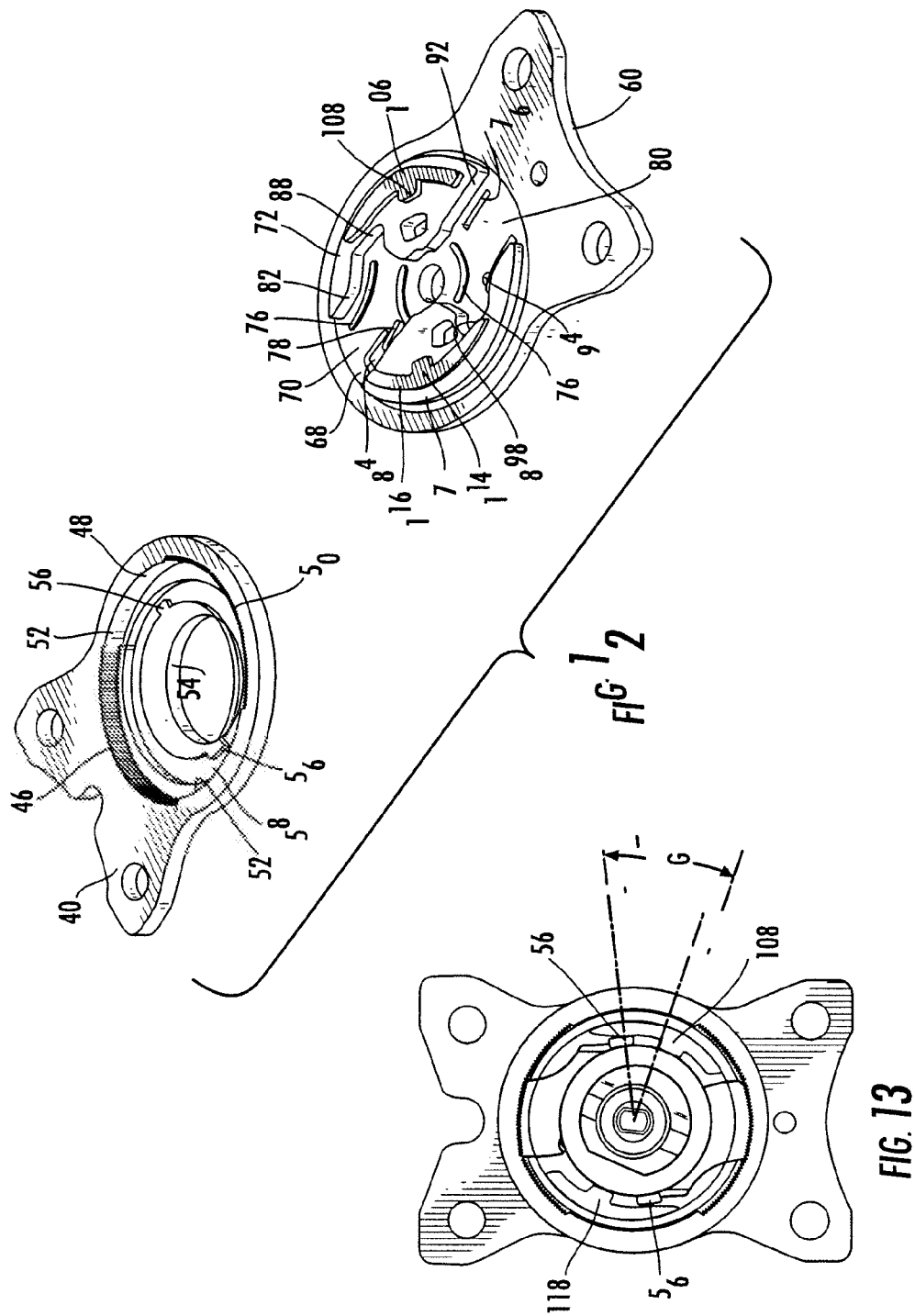

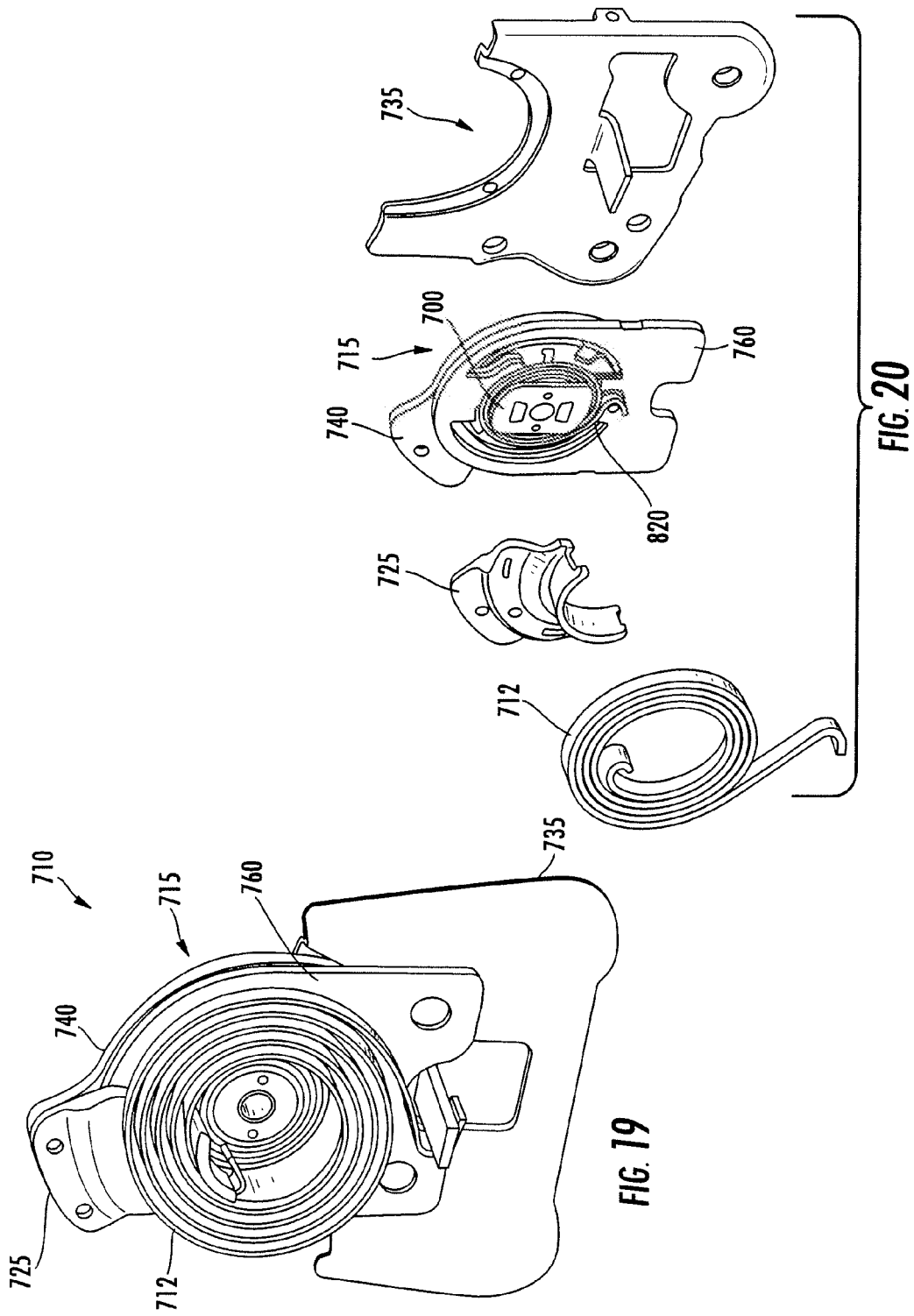

ROTARY RECLINER MECHANISM

CROSS-REFERENCE TO RELATED PATENT APPLICATIONS

This Application claims the benefit of U.S. Provisional Application No. 60/851,148, filed Oct. 12, 2006 and U.S. Provisional Application No. 60/878,765, filed Jan. 5, 2007, the content of which are incorporated herein by reference in their entirety.

BACKGROUND

The present disclosure relates generally to the field of seating technology and more particularly to the field of recliner mechanisms for adjusting the position of a seat back with respect to a seat cushion.

Generally, two main types of recliner mechanisms are well known for use in automotive vehicle seats. First is the well known pawl and sector recliner mechanism which commonly uses a pivoted pawl connected to or formed in one structure (such as a seat base frame) and a toothed gear sector connected to or formed in another structure (such as a seat back frame). It is also common to have the pawl and sector incorporated in a separate recliner mechanism that interconnects the seat back frame and the seat base frame. Numerous examples of known pawl and sector recliner mechanisms exist.

Second is the also well known round or rotary recliner mechanism. Numerous examples of round heart recliner mechanism also exist such as those disclosed in U.S. Pat. Nos. 4,143,905; 5,536,217; 6,092,874; and 6,805,650. Most of the known rotary recliner mechanisms utilize a cam mechanism and biased movable lock members commonly having teeth. It is also well known to include a biasing member, typically in the form of a spring, or multiples thereof, for biasing the lock members in a locked position. Commonly, an actuator, such as a handle, is used to actuate the cam mechanism to move the lock members, against the force of the biasing member, to an unlocked position where the teeth of the lock member are disengaged with mating teeth on either of the side plates of the rotary recliner mechanism.

For known rotary recliner mechanisms there remains significant drawbacks and inadequacies requiring undesirable tradeoffs in the designs of such mechanisms. Existing rotary recliner mechanisms are still not sufficiently simple and efficient in operation and can include relatively high actuation efforts or will have a low effort actuation mechanism but with an unacceptable amount of slack or "play" as well as being difficult and costly to efficiently manufacture. Accordingly, improvements in recliner mechanisms, and in particular in rotary recliner mechanisms, remains highly desirable.

SUMMARY

One exemplary embodiment of the disclosure relates to a rotary recliner mechanism including a first or moving member rotatably supported with respect to a second or base member, and a pair of locking arm members movably located between the first and second members for locking the position of the first and second members with respect to one another. The locking arm members are moved into and out of a locking position using a pivoting cam member for moving the locking arm members and at least one disc or cylinder shaped member located between the cam member and at least one of the locking arm members. The rotary recliner mechanism further includes an inner ring member for establishing the range of relative motion between the first and second members, the inner ring member is located on either the first or second members. The first and second members have a plurality of stop members formed therein for engagement with a portion of the inner ring member to define the limits of travel of the recliner mechanism. The rotary recliner mechanism further includes a connecting member for securing the first and second members and for receiving therein a release member and a cam biasing member for biasing the cam member toward the locked position.

One exemplary embodiment of the disclosure relates to a rotary recliner mechanism including a first moving plate or member rotatably supported with respect to a second or base plate or member, a pair of locking arm members movably located between the first and second members for locking the position of the first and second members with respect to one another. The locking arm members are moved using a pivoting cam member and at least one disc member located between the cam member and at least one of the locking arm members. The rotary recliner mechanism further includes a connecting member for securing the first and second members, the connecting member has a passage there through for receiving an actuator member and a cam biasing member for biasing the cam member toward a first position. The rotary recliner mechanism further includes a cap member connected to the actuator member for enclosing the cam biasing member.

One exemplary embodiment of the present disclosure relates to a rotary recliner mechanism including a first member or moving plate rotatably supported with respect to a second member or base plate, and a pair of locking arm members movably located between the first and second members for locking the position of the first and second members with respect to one another. The locking arm members are moved into and out of a locking position using a pivoting cam member and the rotary recliner mechanism includes a return spring member for biasing the first and second members with respect to one another, the return spring member having a first end and a second end, the rotary recliner mechanism further including a cap member for connecting the first and second members and having the first end of the return spring member engaged with the cap member.

In one exemplary embodiment of the present disclosure the cam biasing member is a coil spring having a first end connected to the connecting member and a second end connected to the cam member and the cam biasing member is located internal of the first and second moving members. In an alternate exemplary embodiment, the cam biasing member is located external one of the first and second moving members and is connected between one of the first and second moving members and the cam biasing member located internal the first and second moving members. In another alternate exemplary embodiment, the rotary recliner mechanism further includes a cam guide member located between the first and second moving members and including at least one cam surface for interacting with the disc member when the cam biasing member moves. The cam guide member may be located fixed with respect to one of the first and second moving members.

Another exemplary embodiment of the present disclosure relates to a rotary recliner mechanism including a first member or moving plate rotatably supported with respect to a second member or base plate, wherein the first member has first and second cam passages formed therein for receiving a pair of locking arm members movably located between the first and second members for locking the position of the first and second members with respect to one another. The locking arm members are moved into and out of a locking position using a pivoting cam member and at least one rolling member having a circular cross section located between the cam member and at least one of the locking arm members. The locking arm members have a cam interface surface having a swell portion and a raised portion. The cam member has a first cam surface and a second cam surface.

In another exemplary embodiment of the present disclosure, a rotary recliner mechanism including a first member or moving plate rotatably supported with respect to a second member or base plate, wherein the locking arm members are movably located between the first and second members for locking the position of the first and second members with respect to one another. The locking arm members are moved into and out of a locking position using a pivoting cam member and at least one disc-shaped member located between the cam member and at least one of the locking arm members.

In one exemplary embodiment of the present disclosure, the motion of the disc-shaped member is constrained in a passage in at least one of the first member and the second member. In one exemplary embodiment, the disc-shaped member is a cylinder member wherein a portion of the cylinder member is constrained in a passage in at least one of the first member and the second member. In one particular embodiment the disc-shaped member is a spherical member wherein a portion of the spherical member is constrained between the first member and the second member.

One embodiment of the present disclosure relates to a rotary recliner mechanism including a first member or moving plate rotatably supported with respect to a second member or base plate, including locking arm members movably located between the first and second members for locking the position of the first and second members with respect to one another, the locking arm members are moved into and out of a locking position using a cam member and wherein the locking arm members are movable on non-linear, arcuate paths for locking first and second members.

One embodiment of the present disclosure relates to a rotary recliner mechanism including a first member or moving plate rotatably supported with respect to a second member or base plate. The rotary recliner mechanism further includes pawls or locking arm members movably located between the first and second members for locking the position of the first and second members with respect to one another. The locking arm members are located in a slot in the first member and are moved into and out of a locking position using a cam member. One of the first and second members have a toothed portion for engagement with the locking arm member. The rotary recliner mechanism further includes an inner ring member for establishing the range of relative motion between the first and second members. In one embodiment, the first and second members include a plurality of stop members for engagement with a portion of the inner ring member to define the limits of travel of the rotary recliner mechanism. In one embodiment, the rotary recliner mechanism further includes a disc shaped member located in a slot in one of the first and second outer plate members, wherein the disc shaped member is located to operate between the cam member and one of the locking arm members to provide easier activation of the rotary recliner mechanism. The rotary recliner mechanism further includes an inner member connected to the cam and having a central formed passage for receiving an actuating member. The inner member is configured to connect the first and second members together. The rotary recliner mechanism further includes a cam return spring located external the first and second members. The cam return spring is connected to the inner member.

In an alternate exemplary embodiment of the present disclosure, a rotary recliner mechanism includes a first moving member rotatably supported with respect to a second moving member. The rotary recliner mechanism further includes locking arm members that are movably located between the first and second moving members for locking the position of the first and second moving members with respect to one another. The locking arm members are moved into and out of a locking position using a cam member. The rotary recliner mechanism further includes a central bushing member for connecting the first and second moving members. The central bushing member has an internal formed surface for engaging an actuator member for actuating the recliner mechanism. The rotary recliner mechanism further includes a cam return member located external the first and second moving members. The cam return member is a coil spring having a first end connected to the cam member and a second end connected to one of the first and second moving members. The rotary recliner mechanism further includes a recliner return member which biases the first and second moving members in a first direction. In one particular embodiment, the recliner return member is a coil spring having a first end connected to the first member and a second end fixed such that the first end of the recliner return member biases the first member to rotate in a first direction with respect to the second member.

BRIEF DESCRIPTION OF THE DRAWINGS

FIG. 7 is an exploded perspective view of the rotary recliner mechanism of FIG. 3.

FIG. 8 is a cross-section, plan view of the rotary recliner mechanism according to the present invention.

FIG. 10 is the rotary recliner mechanism of FIG. 9 in an unlocked position.

FIG. 11 is the rotary recliner mechanism of FIG. 9 showing the locking members in a fully retracted position.

FIG. 12 is a partial perspective view of the first plate and second plates of the rotary recliner mechanism of FIG. 3 showing the detail of the stops for setting the operating range of the rotary recliner mechanism.

FIG. 13 is a partial, plan view of the rotary recliner mechanism of the present invention detailing the stop elements and the limit of travel of the rotary recliner mechanism as assembled.

FIGS. 19 through 26 illustrate a rotary recliner mechanism according to an alternative embodiment.

DETAILED DESCRIPTION

Figure 1:
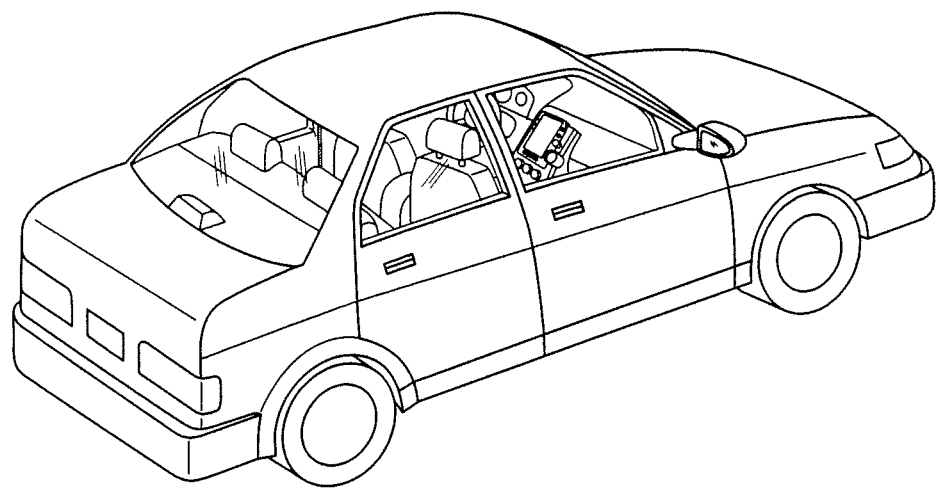
FIG. 1 is a perspective view of a vehicle that a rotary recliner mechanism is used in according to an exemplary embodiment.
Figure 2:
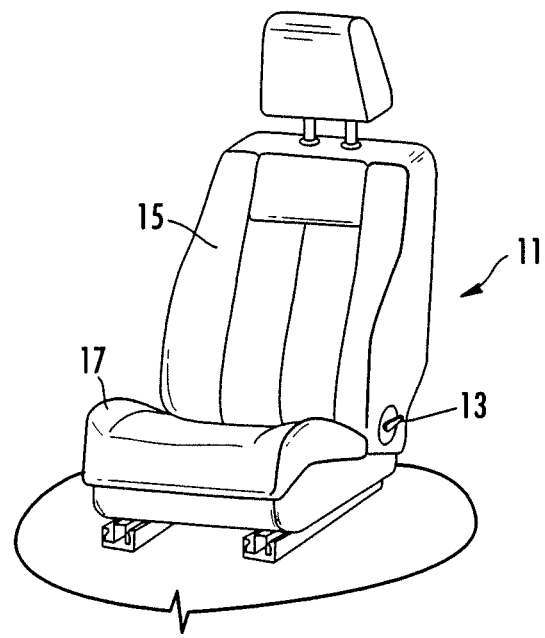
FIG. 2 is a perspective view of a vehicle seat that a rotary recliner mechanism is used with according to an exemplary embodiment.

The figures illustrate exemplary embodiments of a component or assembly shown as a recliner mechanism for use as a rotary seat recliner mechanism for releasably locking the position of a seatback in one or more desired positions in a vehicle (e.g., automobiles such as cars, trucks, sport utility vehicles, minivans, buses, and the like; airplanes, boats, etc.). The recliner mechanism may be provided in a wide variety of sizes, shapes, and configurations, and with or without various accessories or hardware for cooperating with the seatback and seat base to improve functionality according to the various exemplary embodiments. The rotary recliner mechanism is shown and described for use with a vehicle seat but may be used with any type of device for releasably locking the position of one member to another.

Referring generally to the figures and with initial particular reference to FIGS. 1 through 13, a rotary recliner mechanism 10 is shown. The rotary recliner mechanism 10 (see FIG. 3) is designed for use with a vehicle seat 11 having a seatback 15 and a seat base 17, as is well known. For connection with the frames of the vehicle seatback and seat base (see FIG. 25), the rotary recliner mechanism 10 includes a plurality of holes for use with a fastener, parent metal staking, welding or any other type of attachment device or method. Further, it should be understood that the rotary recliner mechanism 10 may be made integral with the frames of the vehicle seat 11 in any known or desirable manner.

The rotary recliner mechanism 10 includes a seatback return spring 12 including a first end 14, for connection to the seatback frame, and a second end 16 connected to the rotary recliner mechanism 10 (as detailed below) for biasing the seatback 15 with respect to the seat base 17 as is well known. The seatback return spring 12 is a wound, clock type spring made of an appropriate material and having an appropriate spring constant for a given vehicle seat application.

The rotary recliner mechanism 10 includes a shaft 20 located along a centerline of the rotary recliner mechanism 10 for connection with a handle member 13 for actuating (unlocking) the rotary recliner mechanism 10. The shaft 20 has a first end 22 and a distal, second end 24. The first end 22 of the shaft 20 is preferably designed to include an appropriate or known structure or feature for connecting with the handle member 13.

Figure 3:
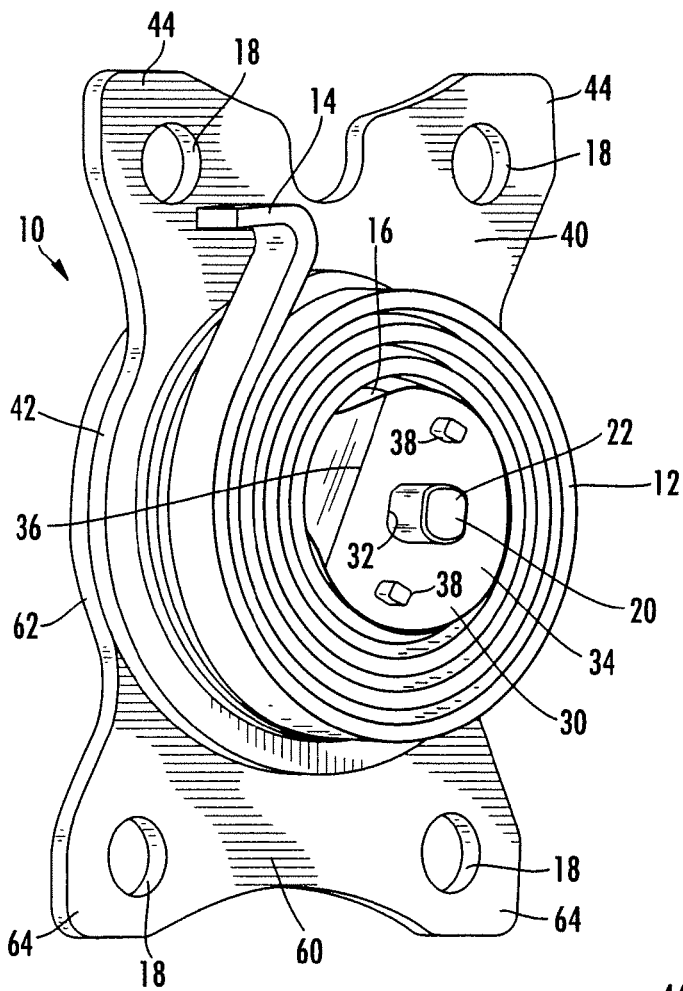
FIG. 3 is a perspective view of a rotary recliner mechanism according to an exemplary embodiment.

In the embodiment of FIG. 3, the rotary recliner mechanism 10 includes a cap 30 connected thereto for covering or containing the parts of the rotary recliner mechanism 10, as described below. The cap 30 includes a centrally located passage 32 therein in the shape of a round hole but may include any other known appropriate shape. The first end 22 of the shaft 20 extends from the passage 32. The cap 30 includes a first portion 34 containing the passage 32 that is substantially disc shaped. A second portion 36 of the cap 30 angularly extends from the first portion 34 as a tab extension.

The second portion 36 preferably extends at approximately a right angle from the first portion 34 and is designed to engage the first end 16 of the seatback return spring 12. The cap 30 further includes holes 38 for connecting the cap 30 to the rotary recliner mechanism 10.

The rotary recliner mechanism 10 includes a first plate member 40 and a second plate member 60. The first and second plate members 40, 60 are preferably made of high strength steel and are stamped, formed and/or machined as appropriate. The first and second plate members 40, 60 have relatively thin profiles in that they have relatively similar width and height dimension and a relatively thin height or thickness. The first plate member 40 includes a first portion 42 having a shaped outer perimeter and a pair of extensions 44 each having a hole 18. Similarly, the second plate member 60 includes a first portion 62 having a mostly round shaped outer perimeter and a pair of extensions 64 each having a hole 18.

The first plate member 40 is formed to be rotated with respect to the second plate member 60 on a common pivot axis. The first plate member 40 is pivotally secured to the second plate member using an inner ring member 100 (see FIG. 5). The inner ring member 100 has a first end 102 that interfaces with the second plate member 60, preferably it is connected thereto, and a second end 104 which interacts with the seatback return spring 12 and retains the cap 30. The inner ring member 100 also includes a disc or ring extension member 106 located between the first end 102 and the second end 104 and located aligned with and proximate the first plate member 40.

The inner ring member 100 also includes a pair of extension leg members 108 constituting the second end 104. Each extension leg member 108 is a partial cylinder-shaped portion radially extending over a predetermined arc length and axially extending along a portion of the shaft 20. At an end 110 of each extension leg member 108, there is a further, more narrow, extension member 112 for securing the cap 30 to the inner ring member 100 of the rotary recliner mechanism 10. Each extension member 112 is preferably designed to be received in a respective passage 38 in the cap 30 and to then be mechanically deformed to lock the cap 30 to first end 104 of the inner ring member 100. The locking, fixing or connecting of the cap 30 to the inner ring member 100 may be done using any known or appropriate device or process such as fasteners, welding, parent metal staking, etc.

Figure 4:
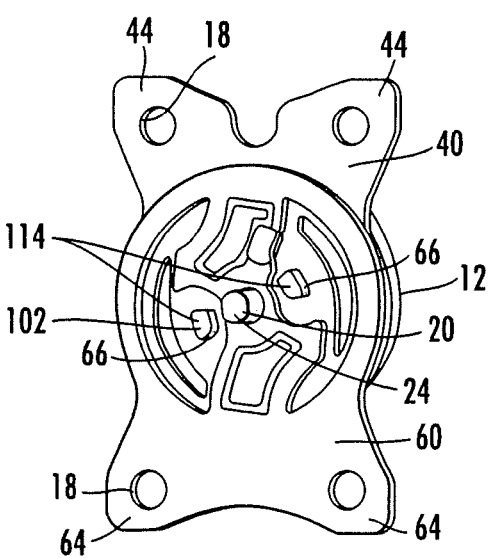
FIG. 4 is a reverse perspective view of the rotary recliner mechanism of FIG. 3.
Figure 5:
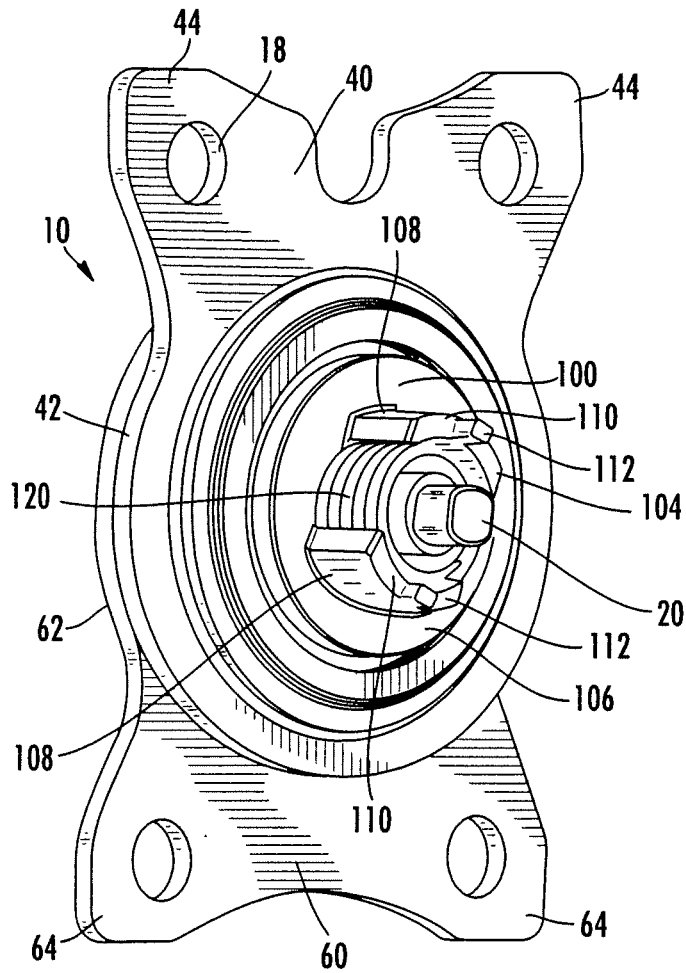
FIG. 5 is a perspective view of the rotary recliner mechanism of FIG. 3 wherein a return spring is removed.

The first end 102 of the inner ring member 100 includes a pair of extension members 114 which extend through the first and second plate members 40, 60 (see FIG. 4). Each extension member 114 passes through a respective passage or hole 66 in the second plate member 60 and is then deformed to mechanically lock the inner ring member 100 to the second plate member 60. The locking of the extension members 114 of the inner ring member 100 to the second plate member 60 may be done using any known or appropriate device or process such as fasteners, welding, parent metal staking, etc. The inner ring member 100 thus secures the first and second plate members 40, 60, and the cap 30 which thereby contain all of the internal components of the rotary recliner mechanism 10, as more fully described below.

Referring in particular to FIG. 6 through FIG. 11, the rotary recliner mechanism 10 includes a cam mechanism 130 located internal of the first and second plate members 40, 60. The cam mechanism 130 is connected with the shaft 20 and is actuated thereby. The cam mechanism 130 operates to lock and unlock the rotary recliner mechanism 10 to allow adjustment of the seatback 15. The cam mechanism 130 is used for controlling a primary locking member 140 and a secondary locking member 160. However, it is possible that the rotary recliner mechanism 10 could be designed to have fewer or greater locking members as appropriate for a particular application.

The primary locking member 140 includes a toothed sector portion 142 for engaging a complimentary toothed sector portion 46 formed along a recessed inner perimeter portion 48 of the first plate member 40, as best shown in FIGS. 9-12. Similarly, the secondary locking member 160 includes a toothed sector portion 162 for engaging a complimentary toothed sector portion 50 formed along the recessed inner perimeter portion 48 of the first plate member 40. The recessed inner perimeter portion 48 of the first plate member 40 includes wall portions 52 located between the toothed sector portions 46 and 50. It should be noted that wall portions 52 are located slightly radially inward of the toothed sector portions 46 and 50. It should also be noted that the relative arc lengths of the toothed sector portions 46 and 50 and the wall portions 50 are selected to provide an appropriate operating range of motion for the rotary recliner mechanism 10 as may be desired for a given application. It is possible, but not normally desirable for vehicle seating applications, to provide 360 degrees of operation by eliminating the wall portions 52, so that the recliner mechanism 10 becomes a continuous type rotary recliner device.

Referring additionally to FIG. 12 in particular, the primary locking member 140 (not shown in FIG. 12) is principally located in a formed recess or slot 70 in the second plate member 60, the recess 70 being defined by first and second extensions 72 and 74, respectively, extending from a surface 68 of the second plate member 60. The first and second extensions 72, 74 extend axially from the surface 68 and also extend radially and arcuately along the second plate member 60 to include various functional features for operating the rotary recliner mechanism 10. The first and second extensions 72, 74 also define a recess or slot 80 in the second plate member 60 for receiving the secondary locking member 160 (not shown in FIG. 12). The first and second extensions 72, 74 are formed to be very similar in structure with the first extension 72 being positioned opposite and rotated approximately 180 degrees from the second extension 74.

The second plate member 60 further includes a plurality of pads 76 which extend a predetermined distance from the surface 68 of the second plate member 60. The pads 76 are optimally located to support the movement of the cam mechanism 130 and the first and second locking members 140, 160 to lessen the amount of friction with the surface 68 making the rotary recliner mechanism 10 easier to operate. The pads 76 preferably extend a minimal nominal distance from the surface 68, enough to avoid interference between the surface and the moving parts of the rotary recliner mechanism 10. Accordingly, the pads 76 further define the recesses 70 and 80.

The recesses 70 and 80 are also preferably designed to allow the first and second locking members 140, 160, respectively, to relatively freely move therein and to prevent the first and second locking members 140, 160, from binding or locking in the recesses 70 and 80, respectively. Accordingly, the rotary recliner mechanism 10 does not require a high degree of precision parts and related costly machining but is still robust and has a relatively very low "chuck" or "free play" for the reasons stated below.

The second plate member 60 further includes a cam pin recess 78 extending axially from the surface 68 and connected with the recess 70. However, the cam pin recess 78 extends from the surface 68 in an axially opposite direction than the first and second extensions 72, 74. The cam pin recess 78 primarily extends radially as explained below.

Referring more particularly to FIGS. 6-12, the primary locking member 140 includes a first arcuately formed side wall 144 formed complimentary with a side wall 82 of the extension 72. The side wall 82 further defines the recess 70 and a path along which the locking member 140 moves when actuated by the cam mechanism 130. The side wall 144 extends from a location proximate one end of the toothed sector portion 142. A second side wall 146 of the primary locking member 140 extends arcuately from a second end of the toothed sector portion 142. The second extension 74 includes an arcuately formed side wall 84 formed complimentary with the second side wall 146 of the primary locking member 140 to further limit the path along which the primary locking member 140 will move. The recess 70 is further defined by a back wall 88 which defines the limit of travel of the primary locking member 140. The primary locking member 140 includes an end wall 148 formed to be complementary with back wall 88 for abutment therewith.

Similar to the primary locking member 140, the secondary locking member 160 includes a first formed side wall 164 formed complimentary with a side wall 94 of the second extension 74. The side wall 94 further defines the recess 80 and a path along which the secondary locking member 160 moves when actuated by the cam mechanism 130. The side wall 164 extends from a location proximate one end of the toothed sector portion 162. A second side wall 166 of the secondary locking member 160 extends arcuately from a second end of the toothed sector portion 162. The first extension 72 includes an arcuately formed side wall 92 formed complimentary with the second side wall 166 of the secondary locking member 160 to further limit the path along which the secondary locking member 160 will move. The recess 80 is further defined by a back wall 98 which defines the limit of travel of the secondary locking member 160. The secondary locking member 160 includes an end wall 168 formed complementary with back wall 98 for abutment therewith.

Referring more particularly to FIGS. 7-8, the cam mechanism 130 includes a cam plate member 180 and a return spring 120. The return spring has a first end 122 connected with a passage or hole 128 in cam plate member 180 and a second end 124 for connection with the inner ring member 100. The return spring 120 is a wound coil spring having energy stored therein to bias the cam plate member 180 in a counter-clockwise direction, as shown in FIGS. 7 through 11. The shaft 20 passes through a center of the return spring 120 which is located concentric and internal of the extension leg members 108 of the second end 104 of the inner ring member 100. The return spring 120 is located beneath the cap 30.

The cam plate member 180 has a relatively constant thickness and is substantially overall rectangular in shape but may have any appropriate shape given the operating the primary and secondary locking members 140, 160. The cam plate member 180 includes a centrally located passage or hole 182 for connecting the cam plate member 180 to the shaft 20. The shaft 20 is located in the passage 182 and the cam plate member 180 is connected with the shaft 20 using a double "D" shaped passage 182. The cam plate member 180 may alternatively be connected to the shaft 20 using any know or appropriate device or process such as a fastener, bracket, interference fit or weld of any type provided that the shaft 20 is connected to the cam plate member 180 such that rotation of the shaft 20 results in rotation of the cam plate member 180. The shaft 20 is axially inserted in the passage 182 of the cam plate member 180 and is limited in its axial direction between the cam plate member 180 and the cap 30.

Figure 9:
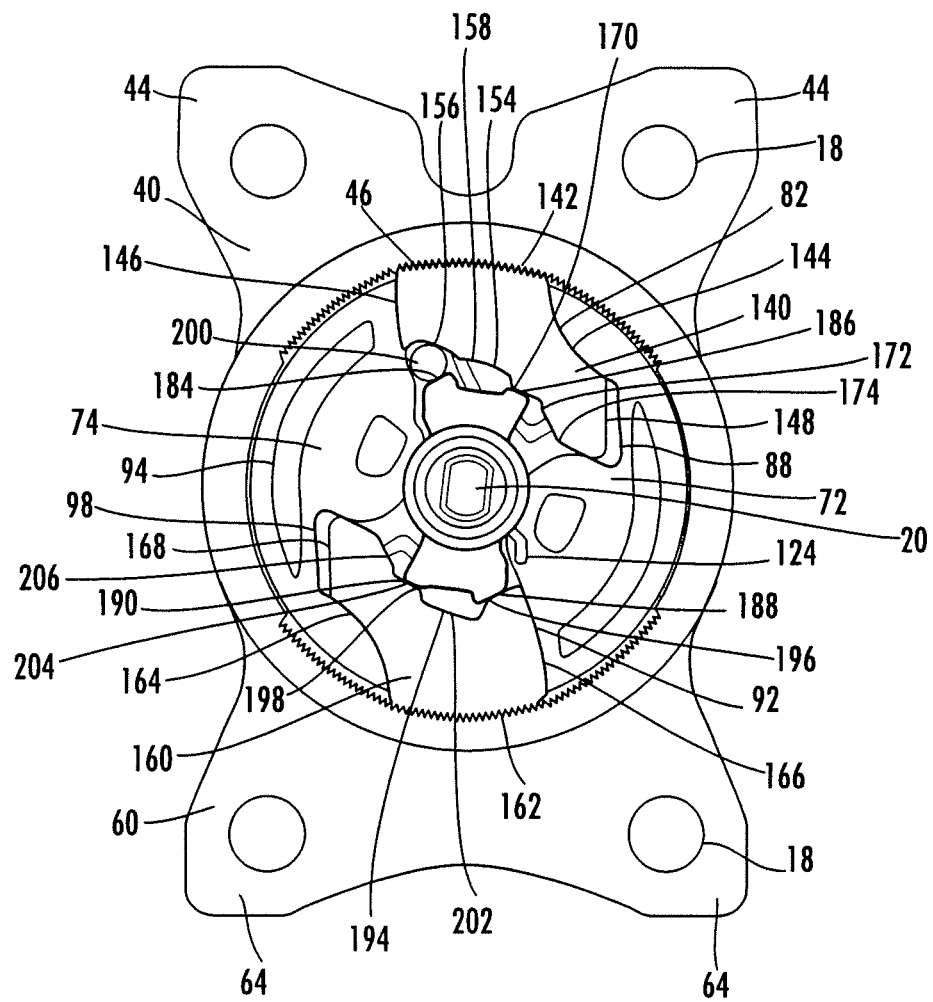
FIG. 9 is a partial plan view of the rotary recliner mechanism of FIG. 3 in the locked position with the first plate partially removed to show the detail of the interior of the rotary recliner mechanism.
Figure 15:
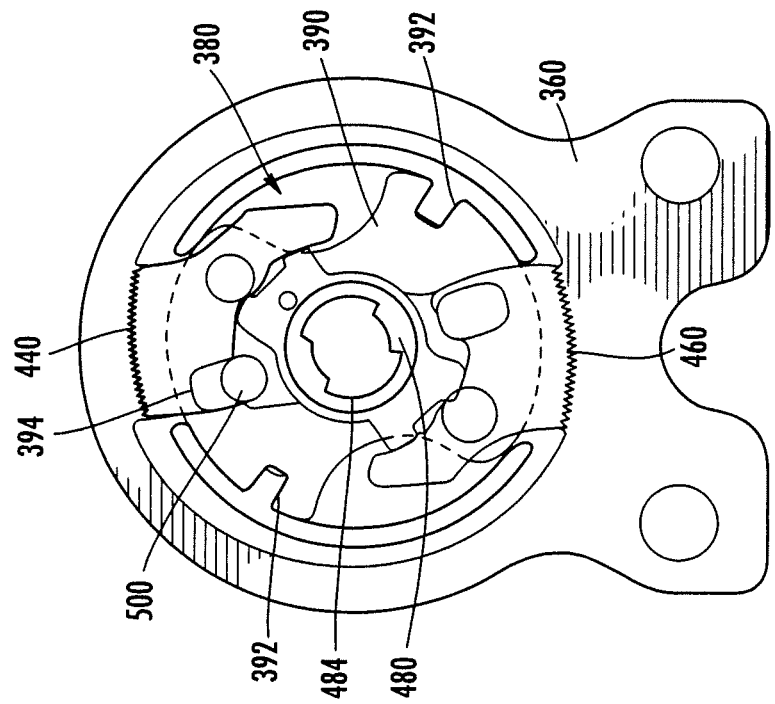
FIG. 15 is a partial, plan view of the rotary recliner mechanism of FIG. 14 wherein a first or moving plate is removed to show the detail of the interior of the rotary recliner mechanism.

Referring more particularly to FIGS. 9-11, the cam plate member 180 has four peripheral engagement surfaces located proximal the four corners of its rectangular shape which can be reconfigured as appropriate for a given application. A first engagement surface 184 has a relatively flat, contoured cam surface having an approximately 5° to 6.5° cam angle and preferably about a 5.8° cam angle and is shown located in approximately the eleven o'clock position in FIG. 9. Moving clockwise as shown in FIG. 9 from the first engagement surface 184, the cam plate member 180 has a second engagement surface 186 at approximately the one o'clock position for engagement with a cam interface surface 154 of the primary locking member 140. The cam plate member 180 further includes engagement portions for engagement with the secondary locking member 160.

The cam plate member 180 has a third engagement surface 188, preferably having a cam angle similar to that of the first engagement surface 184 (but it could be a different cam angle), located at approximately the five o'clock position as shown in FIG. 9, for engagement with a cam interface surface 194 of the secondary locking member 160 as well as a fourth engagement surface 190, located at approximately the seven o'clock position as shown in FIG. 9, for engagement with the cam interface surface 194 of the secondary locking member 160.

The cam mechanism 130 further includes a disc or pin member 200 positioned between the first engagement surface 184 of the cam plate member 180 and the cam interface surface 154 of the primary lock member 140 proximate the side wall 84. The disc member 200 is a generally cylinder-shaped member preferably having curved, in particular circular, cross-section. The disc member 200 has a length extending axially of the rotary recliner mechanism 10 that is appropriate for the packaging of the rotary recliner mechanism 10 and can vary as appropriate for a given application provided the disc member 200 functions as noted. A first end of the disc member 200 is preferably located in the recess 68 which serves to limit the movement of the disc member 200 along with the side wall 84 of the first extension 74 and the movement of the disc member 200 along a first dwell portion 156 of the cam interface surface 154 of the primary lock member 140. The first dwell portion 156 of the cam interface surface 154 is located proximal the formed side wall 146. The cam interface surface 154 extends from the first dwell portion 156 along a middle portion 158 to an abutment 170 which leads distally to a raised portion 172 having located distally thereto an abutment surface 174.

Figure 6:
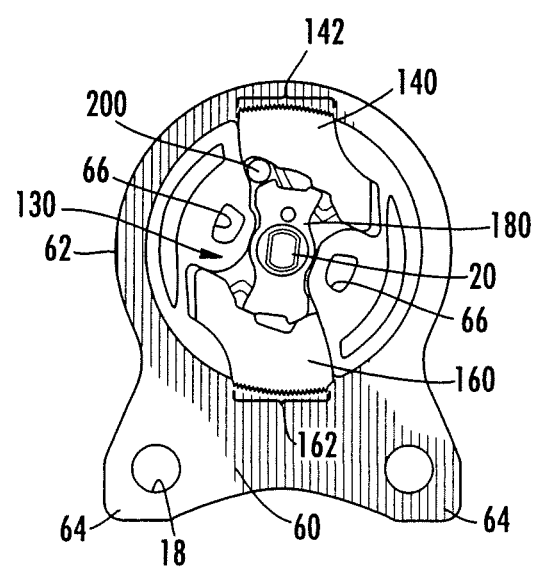
FIG. 6 is a partial perspective view of the rotary recliner mechanism of FIG. 5 wherein a first or moving plate is removed to show the detail of the interior of the rotary recliner mechanism.

As best shown in FIGS. 6 and 9, the rotary recliner mechanism 10 is in a locked, fixed position wherein the shaft 20 and the cam plate member 180 are biased counter-clockwise or positioned by the cam return spring 120. In the locked position, the primary locking member 140 is locked in position by the first and second engagement surfaces 184, 186 of the cam plate member 180 including the disc member 200 located between the dwell portion 156 in the cam interface surface 154 of the primary locking member 140 and the first engagement surface 184. A radian extending from a center axis X of the shaft 20 will pass through a center axis of the disc member 200 as well as a contact point between the first engagement surface 184 and the dwell portion 156. However, because the first engagement surface 184 is substantially flat as compared to the curvature of the perimeter of the disc member 200, the cam plate member 180 incurs little resistance against rotation due to the contact of the first engagement surface 184 with the disc member 200.

As the cam mechanism 130 is activated by turning the shaft 20, such as in the clockwise direction as shown in FIG. 10, the cam plate member 180 rotates clockwise and the second engagement surface 186 moves along the raised timing portion 172 of the cam interface surface 154 of the primary locking member 140 until the cam plate member 180 contacts the abutment surface 174 and forces the primary locking member 140 to move. As the cam plate member 180 rotates, the first engagement surface 184 rotates along and then past the disc member 200 as recess 78 prevents the disc member 200 from moving angularly. As the first engagement surface 184 clears the disc member 200, the disc member 200 becomes free to move in the recess 78 in a radial direction allowing the primary locking member 140 to move as the cam plate member 180 engages the abutment 174. As the disc member 200 moves radially inward, the primary lock member 140 moves in the recess 70 and its path of movement is guided by side walls 82 and 84 to move linearly along a curved path (arcuately) until the end wall 148 of the primary locking member 140 engages the end wall 88 of the recess 70. As the primary locking member 140 moves from the locked position, the toothed sector portion 142 of the primary locking member 140 disengages from the toothed sector portion 46 of the first plate 40 thereby unlocking the first plate 40 from the second plate 60 and allowing the relative angular position of the first and second position to be changed against the force of the return spring 12.

Upon release of the handle 13 or other force applying member such as a motor connected to a torque rod (not shown) the shaft 20 rotates counter-clockwise due to the bias force of the cam return spring 120. As the shaft 20 rotates counter-clockwise, the cam plate member 180 rotates counter-clockwise and the first engagement surface 184 is forced against the disc member 200 forcing the disc member 200 to move in the recess 78 and against the side wall 84. As the disc member 200 moves radially outward along the side wall 84 it forces the primary locking member 140 to move in the recess 70 toward the recessed inner portion 48 of the first plate member 40 and against the side wall 82 thereby eliminating the "chuck" or "free play" of the rotary recliner mechanism 10 by eliminating the looseness of the primary locking member 140 within the recess 70.

As the primary locking member 140 moves from the unlocked position toward the locked position, the toothed sector portion 142 engages the toothed sector portion 46 to lock the position of the second plate member 60 with respect to the first plate member 40. The disc member 200 is again located in the first dwell portion 156 of the cam interface surface 154. As can be seen, the first dwell portion 156 and the first engagement surface 184 are preferably angled with respect to one another to open angularly toward the side wall 84. Thus, the cam plate member 180 wedges the disc member 200 against the primary locking member 140. As the cam plate member 180 rotates counter-clockwise, the second engagement surface 186 again contacts the raised portion 174 of the cam interface surface 154 of the primary locking member 140 to force the primary locking member 140 into engagement with the first plate 40.

Similar to the primary locking member 140, the secondary locking member 160 moves in recess 80 between a locked position (FIG. 9) in which the toothed sector portion 162 of the secondary locking member 160 engages the toothed sector portion 50 of the first plate 40. The secondary locking member 160 includes a cam interface surface 194 having a first abutment surface portion 196 which corresponds with the third engagement surface 188 of the cam lock member 180. The secondary locking member 160 further includes second abutment surface 198 as part of the cam interface surface 194, the second abutment surface 198 corresponds with the fourth engagement surface 190 of the cam lock member 180. Between the first abutment surface 196 and the second abutment surface 198, the cam interface surface 194 of the secondary locking member 160 includes a dwell portion 202. Toward a distal end of the cam interface surface 194, the second abutment surface 198 extends to create a timing surface 204 for engagement with the fourth engagement surface 190 of the cam plate member 180. Accordingly, as the cam plate member 180 is rotated, the third engagement surface 188 slides along the first abutment surface 196 of the cam interface surface 194 of the secondary locking member 160 until it is above the dwell portion 202. At the same time, the fourth engagement surface 190 of the cam plate member 180 moves along the second abutment surface 198 and into engagement with a land 206 of the cam interface surface 194. The force of the cam plate member 180 is transferred to land 206 to move the secondary locking member 160 in the recess 80 toward the back wall 98 and away from the toothed sector portion 50 of the first plate member 40. Accordingly, the secondary locking member 160 moves in unison with the movement of the primary locking member 140 to lock and unlock the relative positions of the first and second plate members 40, 60 with respect to one another and to allow rotation therebetween.

As the cam plate member 180 rotates in the opposite direction under the bias force of the cam return spring 120, the cam plate member 180 forces the secondary locking member 160 to move in the recess 80 away from the back wall 98 and toward the toothed sector portion 50 until the toothed sector portion 162 engages same.

The relative positions of the first and second plate members 40 and 60 are preferably adjusted against the bias force of the seatback return spring 12 as noted above. Further, the limits of travel of the first and second plates 40, 60 are limited by stops located on inner partial annular features of the first and second plates 40, 60. In particular, the first plate 40 includes an inner annular ring portion 54 extending a predetermined distance in the axial direction from a concentric annular recess portion 58. The inner annular ring 54 includes first and second radially extending tab portions 56 located opposite each other as shown in FIG. 12. The tab portions 56 are located in a design position to interact with similar tab stops in the second plate 60 to set the limits of travel for the recliner mechanism 10. If desired, it is possible to eliminate the tab portions 56 and allow continuous rotation of the first plate 40 with respect to the second plate 60.

The second plate 60 includes an arc-shaped extension member 106 extending axially from the first extension 72 of the second plate 60. An outer portion of the extension member 106 has an outer surface which preferably corresponds to or matches the perimeter of the recess portion 58 for movement with respect thereto. The extension member 106 includes a stop 108 extending radially inward. The stop 108 of the extension member 106 has an inner surface for movement with respect to the outer perimeter surface of the inner annular ring 54 of the first plate 40.

The second plate 60 further includes an arc shaped extension member 116 extending axially and from the second extension 74 of the second plate 60 and having a radial and angular extent such that the outer portion of the extension member 116 has an outer surface which matches the perimeter of the recess portion 58 for movement with respect thereto. The extension member 116 includes a stop 118 extending radially inward. The stop 118 of the extension member 116 has an inner surface for movement with respect to the outer perimeter surface of the inner annular ring 54 of the first plate 40. Accordingly, the angular limit of travel G, as best shown in FIG. 13, wherein the travel limit for the rotary recliner mechanism 10 is defined in part by when the tab portions 56 engage the stops 108, 118. It is also possible to provide alternative structures and features incorporated in the first and second plates 40 and 60 to set the limit of travel of the recliner mechanism 10 as is best shown in FIG. 13 by the angle G.

With particular attention now to FIGS. 14 through 18, there is shown as an alternate embodiment rotary recliner mechanism 310. The rotary recliner mechanism 310 functions similarly to the rotary recliner mechanism 10 discussed above and includes the unique cam mechanism 130 construction of the above rotary recliner mechanism 10 and also includes alternative or additional features which are the focus of the current description while generally the parts that are similar are already understood from the above description. In particular, the rotary recliner mechanism 310 includes first and second plate members 340, 360, respectively. The rotary recliner mechanism 310 also includes a cam mechanism 380 for connection with a shaft 320 (not shown) and is actuated thereby. The cam mechanism 380 operates to lock and unlock the rotary recliner mechanism 310 similar to that of the cam mechanism 130 of recliner mechanism 10. Accordingly, the cam mechanism 380 controls the first moving member 340 and a second moving member 360 in the recliner mechanism 310 which are each similar to their counterparts 40 and 60, respectively, in the recliner mechanism 10.

Figure 14:
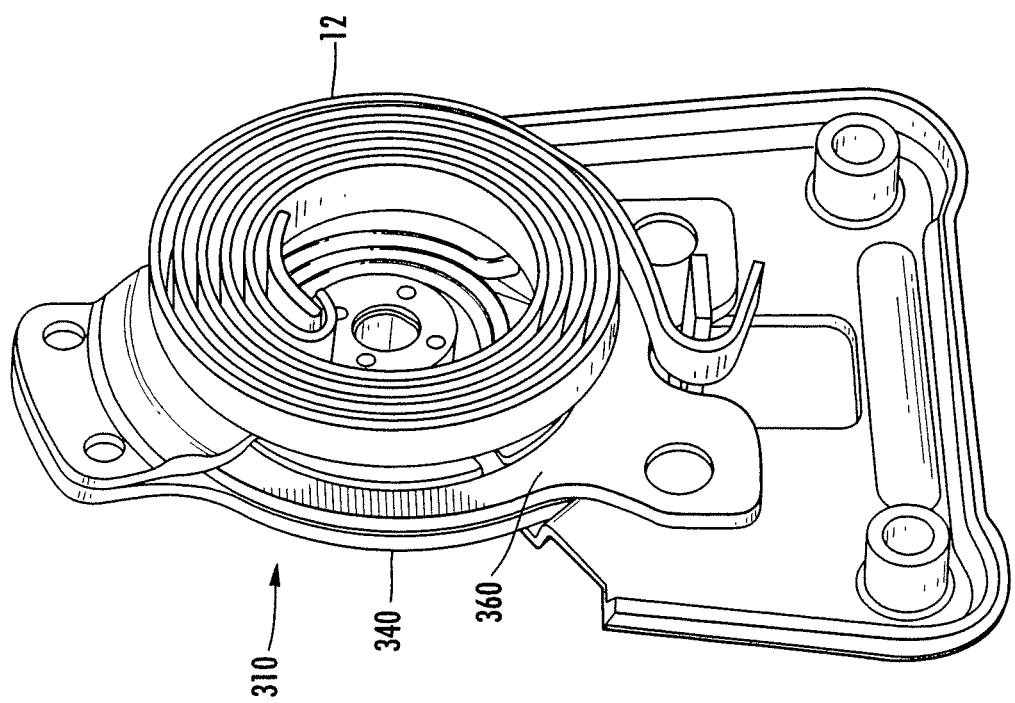
FIG. 14 is a perspective view of a rotary recliner mechanism according to an alternate exemplary embodiment of the present invention.
Figure 16:
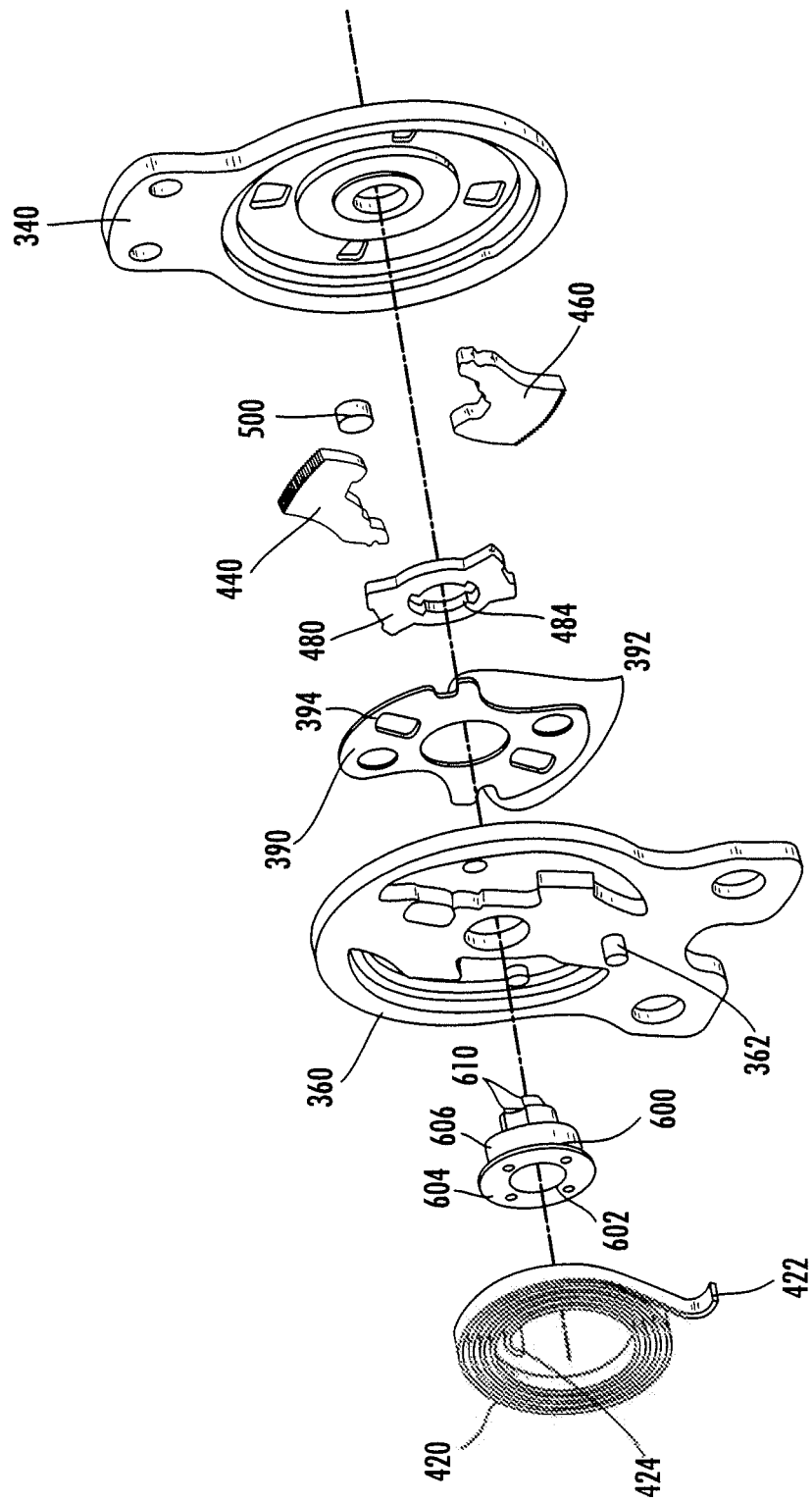
FIG. 16 is an exploded, perspective view of the rotary recliner mechanism of FIG. 14.
Figure 18:
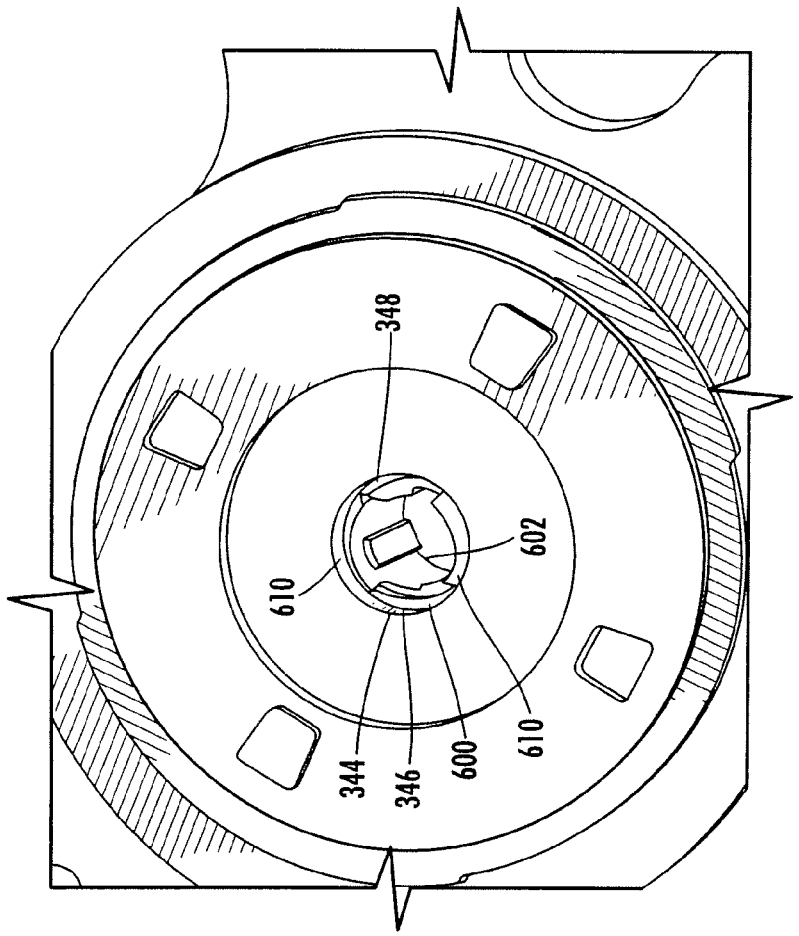
FIG. 18 is a partial, perspective view of the reverse side of the recliner mechanism of FIG. 17.
Figure 17:
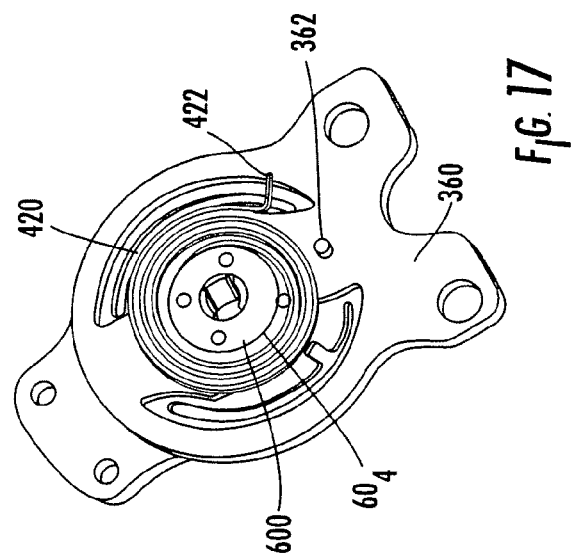
FIG. 17 is a partial, perspective view of the rotary recliner mechanism of FIG. 14.

The cam mechanism 380 of the recliner mechanism 310 includes a cam plate member 480 and its operative surfaces are similar in design and function to that of cam plate member 180 in the recliner mechanism 10 and a disc member 500 that is also similar in design and function to that of disc member 200 in the recliner mechanism 10. The recliner mechanism 310 utilizes a cam return spring 420 that is different in design and application from that of the return spring 120 of the recliner mechanism 10. As best shown in FIGS. 14, 16, and 17, the cam return spring 420 is no longer contained within the recliner mechanism 10; instead, the cam return spring 420 is substantially located external the first and second plate members 340 and 360. In particular the cam return spring 420 is a clock-type spring aligned with and external to an outer side of the second plate member 360. A first or outer end 422 of the cam return spring 420 is connected or fixed to a post 362 of the second plate member 360 or is otherwise anchored to the second plate member 360. The cam return spring 420 has a second or inner end 424 for connection with respect to the cam mechanism 380.

The cam mechanism 380 further includes a first pawl or first locking member 440 and a second pawl or second locking member 460 which have features and operation very similar to that of the primary and secondary locking member 140, 160 respectively of the recliner mechanism 10. The recliner mechanism 310 further similarly includes a disc member 500 having a substantially circular cross-section which interacts with the first locking member 440, the first moving member 340 and the cam mechanism 380 to lock and unlock the locking member 440 similar to the recliner mechanism 10. The cam mechanism 380 further includes a cam plate member 480 which has features and functions similar to that of the cam plate member 180 of the recliner mechanism 10. Accordingly, the cam plate member 480 rotates to interact with the first and second locking members 440, 460 to move them into and out of locking positions which lock the first moving member 340 with respect to the second moving member 360. The cam plate 480 includes a formed central passage 484 for communication with an inner member 600 and an actuating member such as a rod (not shown).

As compared to the recliner mechanism 10, the cam mechanism 380 further includes a guide plate member 390 which is a relatively thin, shaped plate member located between the first and second moving members 340, 360. More particularly the guide plate member 390 is located between the second moving member 360, on the one side, and the cam plate member 480, the first and second locking members 440, 460 and the first moving member 340 on the other side. The guide plate member 390 includes first and second notches 392 for fixing the guide plate member 390 against rotation with respect to the second moving member 360. It should be understood that other structures besides notches 392 can be used to fix the guide plate member 390 with respect to the second moving member 360.

The guide plate member 390 further includes a passage or slot 394 aligned with respect to the disc member 500 for receiving one end of the disc member 500 and for directing the motion of the disc member 500 similar to how the cam pin recess 78 directs the motion of the disc member 200 in the recliner mechanism 10. It should be understood that it is possible for the cam mechanism 310 to optionally include one or both the slot 394 and a cam pin recess 78 for providing guided movement of the disc member 500.

The inner member 600 is primarily a bushing similar to the inner ring member 100 of the recliner mechanism 10. The inner member 600 has a generally hollow cylindrical design including a central, formed passage 602 for receiving the actuating member, such as a rod (not shown), a cap end 604, a main body portion 606 including a connection structure (such as a slot or passage, not shown) for receiving the end 424 of the cam bias spring 420, and a pair of barbed projections 610. The first plate member 340 includes a central passage having a first passage or hole 344 having a first predefined diameter and a second passage or hole 346 having a second predefined diameter. The second hole 346 has a smaller diameter than the first hole 344 to define a radially and angularly extending surface 348 against which the barbs of the projections 610 engage. The inner member 600 functions to connect the first plate member 340 to the second plate member 360 and to connect or function with the cam bias spring 420 to transfer the bias force of the cam bias spring 420 to the cam plate member 480 to bias the recliner mechanism 310 toward the locked or first position.

Referring now to FIGS. 19-26, an alternative exemplary embodiment of a rotary recliner mechanism 710 is illustrated. The rotary recliner mechanism 710 functions similarly to the rotary recliner mechanisms 10 and 310 discussed above and includes a unique construction and alternative or additional features which are the focus of the current description, while the components that are similar are already understood from the above descriptions regarding rotary recliner mechanisms 10 and 310.

Referring in particular to FIGS. 19 and 20, the rotary recliner mechanism 710 includes a return spring 712 that operates similarly to the return spring 12 to bias a seatback 15 with respect to a seat base 17. The rotary recliner mechanism 710 also includes an upper bracket 725 and a lower bracket 735, which are mounted on opposite sides of a subassembly 715. The return spring 712 is positioned around a mounting member on the upper bracket 725. A first end of the return spring 712 is restrained by a projection on the lower bracket 735, and a second end of the return spring 712 is restrained by a notch or relief in the mounting member on the upper bracket 725. The upper and lower brackets 725, 735 are located on opposite sides of the subassembly 715.

Figure 23:
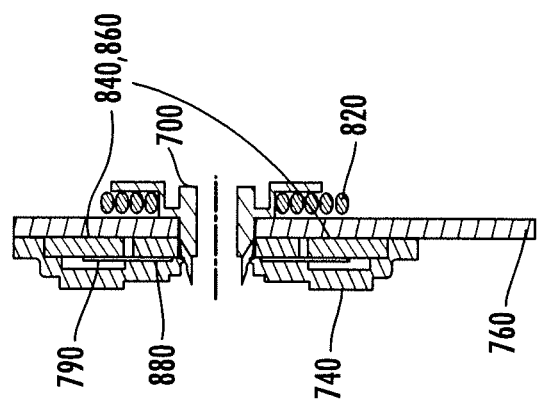

Referring now to FIGS. 19-22, the subassembly 715 according to an exemplary embodiment is shown in greater detail. The subassembly 715 includes a bushing 700 (e.g., a plastic bushing), a spring, shown as a cam spring 820, a first plate, shown as a base plate 760, first and second locking members 840, 860 (e.g., pawls, etc.), a cam plate 880, two pins 900, 902, a guide plate 790, and a second plate, shown as a tooth plate 740. The bushing 700 has a pair of raised portions 702 upon which the cam spring 820 is positioned. A first end of the cam spring 820 is restrained by one of the raised portions 702, and a second end of the cam spring 820 is restrained by a projection on the base plate 760. As shown in FIG. 23, the cam spring 820 is positioned between a flat portion of the bushing 700 and the base plate 760.

Figure 21:
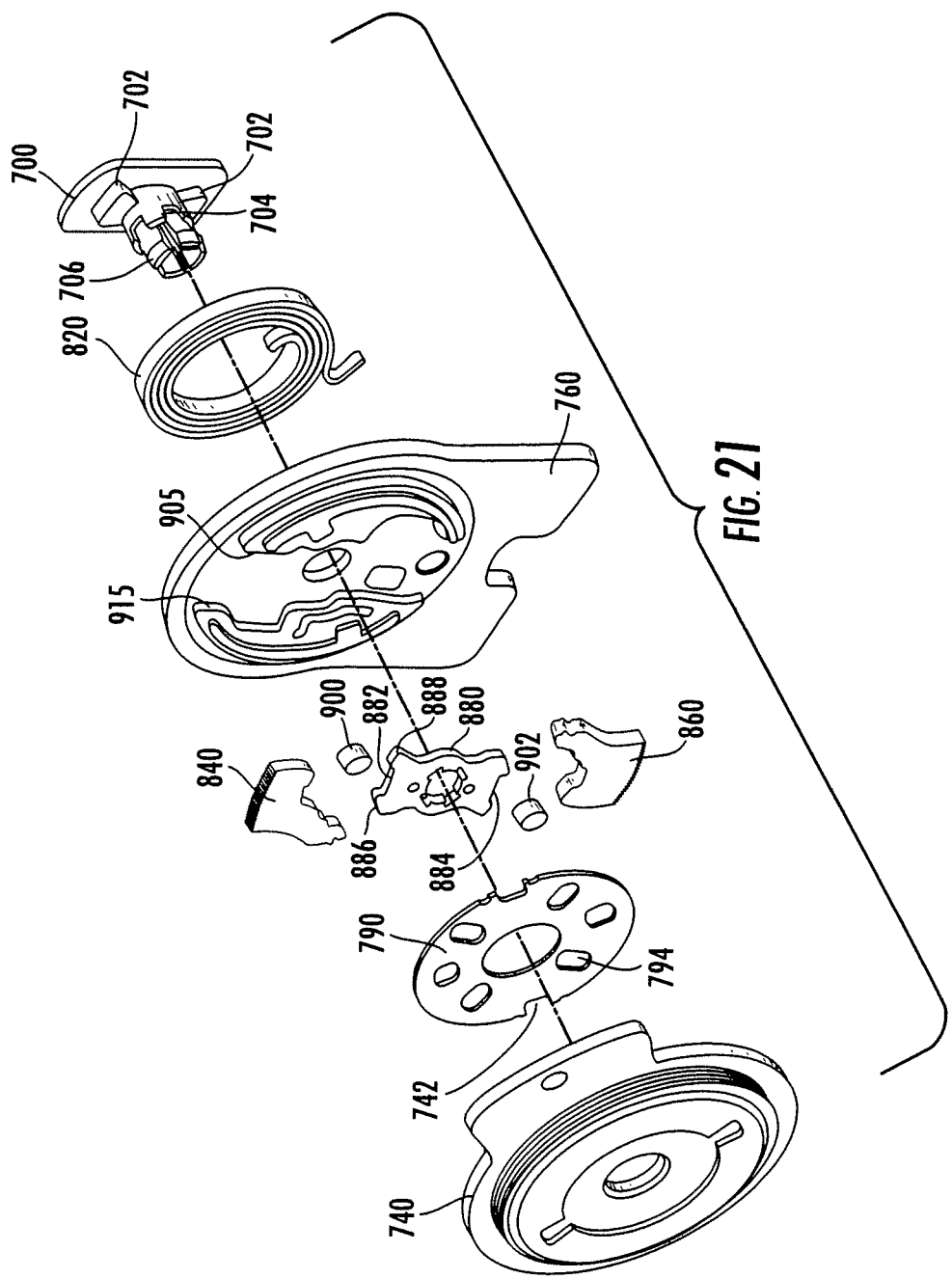

Referring to FIGS. 21 and 23, the bushing 700 passes through a hole in the base plate 760 and further through the cam plate 880. The bushing 700 may rotate with respect to the base plate 760. The bushing 700 has one or more keyed portions 704 (projections, raised surfaces, etc.) as best shown in FIG. 21 that engage complementary keyed portions on the inner surface of a hole in the cam plate 880 such that the cam plate 880 rotates with the bushing 700. An end of the bushing 700 includes one or more fasteners 706 (e.g., clips, retainers, etc.) configured to secure the bushing to the tooth plate 740. For example, as shown in FIG. 21, the bushing 700 may include a snap-in barbed projection (e.g., a "Christmas-tree" type fastener). According to one embodiment, the bushing 700 is a glass-embedded nylon material. According to various other exemplary embodiments, the bushing 700 may be made of any of a wide variety of suitable materials.

Figure 22:
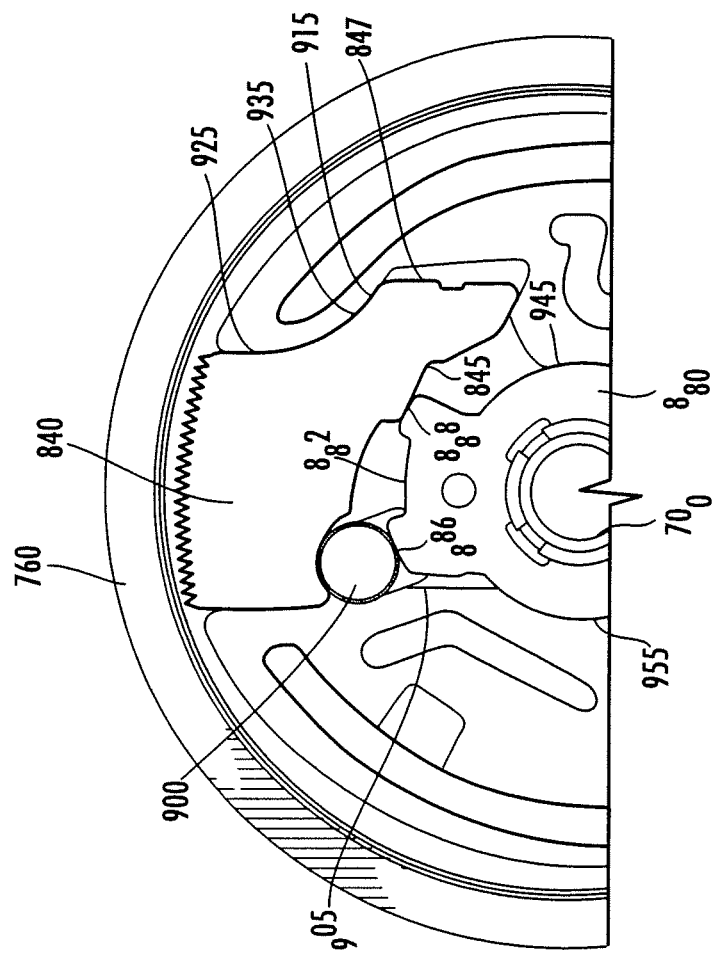

As best shown in FIGS. 21 and 22, a cam mechanism includes the cam plate 880 which interfaces with two discs 900, 902 and the first and second locking members 840, 860 to lock and unlock the rotary recliner mechanism 710 upon rotation of the bushing 700 and actuation of the cam mechanism. As further shown in FIG. 22, rotation of the bushing 700, and thereby the cam plate 880, acts to move the first locking member 840 (and similarly, the second locking member 860) into and out of a locked position. The cam 880 plate has a first end 882 and the second end 884. Because the second end 884 interfaces with the second disc 902 and second locking member 860 in a similar manner to the first end 882, only the first end 882 will be discussed herein, it being understood that the second end 884 of the cam plate 880 is configured in and operates in a like manner. The first end 882 has first and second cam surfaces 886, 888 that interface with the first disc 900 and the first locking member 840. As shown in FIG. 22, the cam plate 880 is close to being in the furthermost counter-clockwise position. The cam plate 880 rides within a recess in the base plate 760 and the rotation of the cam plate 880 is limited by the boundaries of the recess, including wall portions 905 and 915. The cam plate 880 may rotate in the counter-clockwise direction until a wall portion 925 of the cam plate 880 meets the wall portion 905 of the base plate 760, this interface being at approximately eleven o'clock in FIG. 22. In this position, the first cam surface 886 interfaces with the first disc 900, which in turn interfaces with the first locking member 840 such that a toothed sector portion of the first locking member 840 engages a corresponding toothed sector portion of the tooth plate 740 (not shown in FIG. 22), thereby locking the rotary recliner mechanism 710.

As shown in FIG. 22, according to one exemplary embodiment, when the first locking member 840 is in the locked position, the first locking member 840 contacts the wall portion 905 of the base plate 760 proximate the toothed sector portions at a contact area, and a space or gap exists between the first locking member 840 and the walled portion 905 of the base plate 760 proximate the first disc 900 at a spaced area. Further, the first locking member 840 contacts the wall portion 915 of the base plate 760 at two contact areas 925, 935, with a spaced area therebetween where the first locking member 840 does not contact the wall portion of the base plate 760.

As best shown in FIGS. 21 and 22, the cam plate 880 is rotationally fixed to the bushing 700. It should be noted that the cam plate 880 rotates with and is controlled by movement of the bushing 700, and not by the curved wall portions 945, 955 of the base plate 760 surrounding the cam plate 880. According to one embodiment, a clearance space or gap exists between the cam plate 880 and the curved wall portions 945, 955 of the base plate 760, and the cam plate 880 may rotate independently of the base plate 760.

In order to move the first locking member 840 to an unlocked or released position, such that the toothed sector portions of the first and second locking members 840, 860 disengage the corresponding toothed sector portions of the tooth plate 740, the bushing 700 (as depicted in FIG. 22) is rotated clockwise, e.g., by actuating a handle 13 connected to a shaft that in turn rotates the bushing 700. Upon rotation of the bushing 700, the cam plate 880 is likewise rotated clockwise. As the cam plate 880 rotates further, the second cam surface 888 engages a shoulder or wall portion (raised portion) 845 in the first locking member 840 and moves the first locking portion 840 with the cam plate 880 until the wall portion 847 of the first locking member 840 interfaces with the wall portion 915 of the base plate 760. The first cam surface 886 moves clockwise, permitting the disc 900 to move in a direction away from the toothed sector portions, such that the toothed sector portion of the first locking member 840 disengages the corresponding toothed portion of the tooth plate 740. When the wall portion 847 of the first locking member 840 reaches the wall portion 925 of the base plate 760, the cam mechanism is in the released or unlocked position, and the cam plate 880 can rotate no further in the clockwise direction.

Referring back to FIG. 20, it can be seen that the cam spring 820 has one end restrained by the base plate 760 such that upon rotation of the bushing 700, e.g., to move the cam mechanism to an unlocked or released position, the cam spring 820 exerts a bias upon the bushing 700 tending to force the bushing 700 to return to the fully locked position.

Referring to FIG. 21, the guide plate 790 is similar to guide plate member 390 discussed above. The guide plate 790 is a relatively thin, shaped plate member located between the first and second plate members 760, 740. More particularly, the guide plate 790 is located between the second plate member, or tooth plate 740, on the one side, and cam plate 880, the first and second locking members 840, 860, the first and second discs 900, 902, and the first plate member 760, on the other side. The guide plate 790 includes notches 792 for fixing the guide plate 790 against rotation with respect to the first plate member 760, and includes apertures 794 configured to permit the first and second discs 900, 902 to move therein as the rotary recliner mechanism 710 is moved between the locked and released positions.

Figure 24:
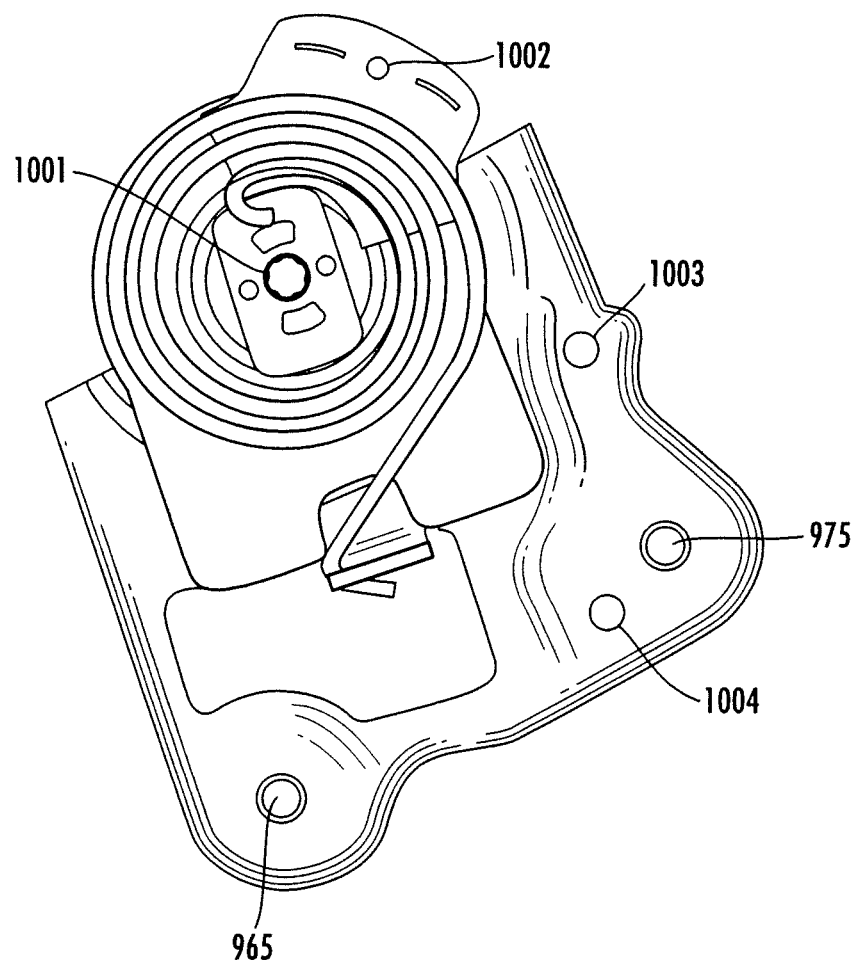
Figure 26:
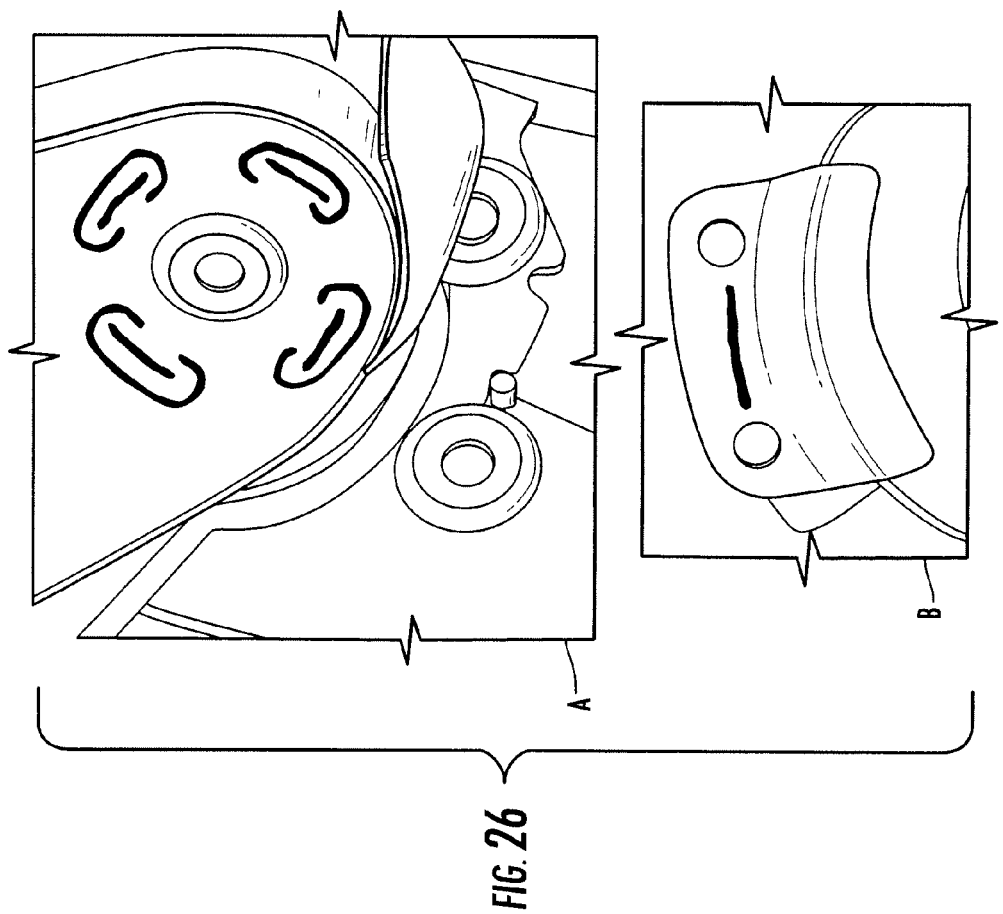
Figure 25:
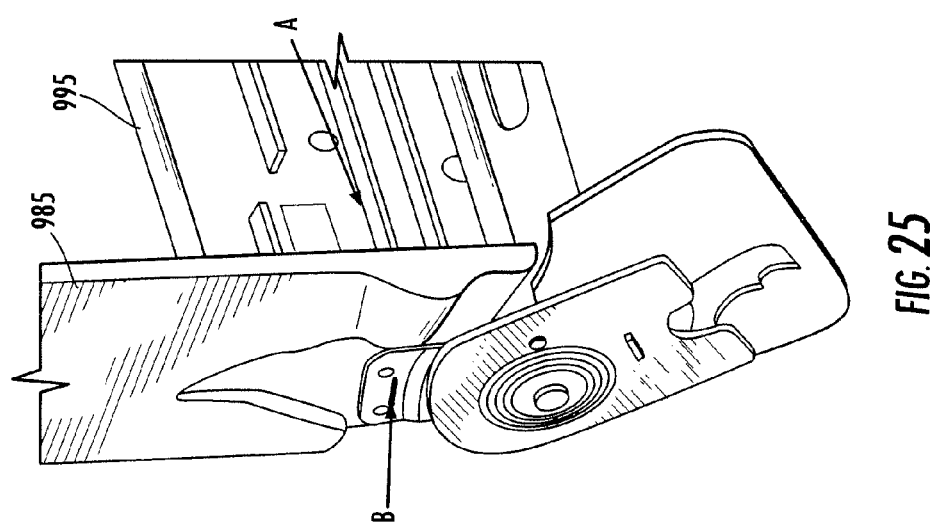

Referring now to FIGS. 24-26, the assembly process for rotary recliner mechanism 710 according to an exemplary embodiment will now be discussed in more detail. First, the various components of the subassembly 715 are assembled, as best shown in FIG. 21. Next, the upper bracket 725 and the lower bracket 735 are assembled to the subassembly 715 and fixturing (not shown) is provided at holes 1001, 1002, 1003, and 1004, as best seen in FIG. 24. According to one exemplary embodiment, the fixturing may be accomplished using a fixturing tool having pins or projections that fit into one or more of holes 1001 through 1004 and locate the components of the rotary recliner mechanism with respect to a tool (e.g., a broaching tool, a laser welder, etc.). Other types of fixturing tools may be used according to various alternative exemplary embodiments. The upper bracket 725 is then laser welded to the subassembly 715 via the tooth plate 740, and the lower bracket 735 is laser welded to the subassembly 715 via the base plate 760. As shown in FIG. 24, according to one exemplary embodiment, a single laser weld in the shape of a generally straight line may be used to weld the upper bracket to the tooth plate. According to various other exemplary embodiments, other appropriate laser weld configurations may be used, including a "C" shaped weld, a circular, or partial-circular weld, and so on. Further, combinations of weld configurations may be used, as best shown in FIG. 26, where a "C" shaped weld partially surrounds a straight line weld. The laser welds may be located at any suitable location, and take any suitable configuration (e.g., a straight line weld, a "C" shaped weld, a circular weld, or a combination of configurations, etc.).

The hole in the bushing 700 is then broached to provide an inner keyed contour for the bushing hole. As shown in FIG. 24, the bushing 700 initially has a generally circular hole. After laser welding the upper and lower brackets 725, 735 the rotary recliner mechanism 710 is moved to a broaching tool, where the rotary recliner mechanism is fixtured at holes 1002, 1003, and 1004, and the hole 1001 in the bushing 700 is broached to create the keyed contour of bushing 700 shown in FIG. 24. Broaching the hole of the bushing 700 after assembly and in a fixtured position provides advantages over using, for example, a traditional bushing having a pre-molded, keyed hole. The keyed hole of the bushing 700 engages a tube (e.g., a "cross-talk tube", not shown) which travels the width of a seat 11 and engages a corresponding opposing rotary recliner mechanism on the far side of the seat 11. Fixturing the broaching tool with respect to, for example, holes 1002-1004 shown in FIG. 24, permits accurate synchronization of opposing rotary recliner mechanisms used in a single seat assembly.

With the use of a traditional pre-molded keyed portion of the bushing (rather than one made using a post-assembly broaching process), tolerances in the manufacturing and assembly processes may result in the opposing rotary recliner mechanisms being misaligned with respect to the cross-talk tube, and improper functioning of the seat assembly (e.g., one rotary recliner mechanism may be held in a released position when the corresponding rotary recliner mechanism is in the locked position, due to misalignment of the opposing rotary recliner mechanisms with respect to the cross-talk tube). It should be noted that a bushing with a pre-molded keyed portion may be used with the rotary recliner mechanism 710.

Broaching the hole of the bushing 700 after assembly and in a fixtured position also avoids the need to provide specialized tooling to, for example, provide unique keyed portions (such as a keyed portion having a plurality of teeth and at least one "missing" tooth) that permits proper alignment of opposing recliner mechanisms via the cross-talk tube.

After broaching the hole in the bushing 700, the return spring 712 is installed (as shown in FIGS. 19 and 20) and the rotary recliner assembly 710 is laser welded to a back frame side member 985, shown in FIG. 25 using fixturing at holes 1003 and 1004 (shown in FIG. 24). The rotary recliner mechanism 710 is laser welded to the back frame side member 985 via the base plate 760. According to one exemplary embodiment, shown in view A of FIG. 26, the components are laser welded at four discrete locations. According to various other exemplary embodiments, varying numbers and locations of laser welds may be used. The back frame side member 985 is then welded to the cross-member 995. Similar steps to those discussed herein are then used to assemble the opposing portion of the seat assembly.

Laser welding the various components discussed herein provides advantages over other fastening methods available. For example, laser welding is performed at relatively lower temperatures as compared with traditional welding processes, resulting in less distortion of parts due to exposure to the associated heat of the welding process, and less heat being transferred to other components of the rotary recliner mechanism and/or seat assembly. Further, while as shown in FIG. 24 and discussed above, holes 1001, 1002, 1003, and 1004 are used at varying times for fixturing the components of the rotary recliner mechanism, other fixturing points or combinations and/or locations of fixturing points may be used according to various alternative exemplary embodiments.

The construction and arrangement of the elements of the rotary recliner mechanism as shown in the exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements of hardware and accessories, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the rotary recliner mechanism may be constructed from any of a wide variety of materials that provide sufficient strength and durability in any of a wide variety of colors, textures and combinations. Other substitutions, modifications, changes and omissions may be made in the design, operating conditions and arrangement of the preferred and other exemplary embodiments without departing from the scope of the present inventions.

The order or sequence of any process or method steps may be varied or resequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present invention.

What is claimed is:

1. A recliner mechanism comprising:
   a first member rotatably supported with respect to a second member;
   at least one locking arm member movably located between the first and second members, the at least one locking arm member configured to lock a position of the first and second members with respect to one another in a locked position;
   a cam member; and
   at least one disc member located between the at least one locking arm member and the cam member when in the locked position, the disc member being configured to move in a radially inward direction when moving the locking arm member into an unlocking position,
   wherein, upon actuating, the cam member is configured to engage or disengage the at least one locking arm member to lock and unlock the first and second members, and
   wherein, when moving the locking arm member into the unlocking position, the cam member is configured to contact an abutment surface of the locking arm member so as to force the locking arm member to move and the disc member becomes free to move in the radially inward direction.

2. The recliner mechanism of claim 1 further comprising a connecting member for securing the first and second members and for receiving therein an actuator member and a cam biasing member for biasing the cam member toward a locked position.

3. The recliner mechanism of claim 2 further comprising a cap member connected to the actuator member for enclosing the cam biasing member.

4. The recliner mechanism of claim 2 wherein the cam biasing member is a coil spring having a first end connected to the connecting member and a second end connected to the cam member.

5. The recliner mechanism of claim 2 wherein the cam biasing member is located internal of the first member and the second member.

6. The recliner mechanism of claim 2 wherein the cam biasing member is located external to the first member and second member.

7. The recliner mechanism of claim 2 further comprising a cam guide member located between the first member and the second member and including at least one cam surface for interacting with the disc member when the cam biasing member moves.

8. The recliner mechanism of claim 7 wherein the cam guide member is fixed with respect to one of the first and second members.

9. The recliner mechanism of claim 2 further comprising a return spring member for biasing the first and second members with respect to one another, the return spring member having a first end and a second end, the recliner mechanism further comprising a cap member for connecting the first and second members and having the first end of the return spring member engaged with the cap member.

10. The recliner mechanism of claim 1 wherein the first and second members have a plurality of stop members for engagement with each other to define limits of travel of the recliner mechanism.

11. A recliner mechanism comprising:
    a moving plate rotatably supported with respect to a base plate, wherein the base plate has an at least one cam passage formed therein for receiving at least one locking arm member, the at least one locking arm member movably located between the moving plate and the base plate for locking a position of the moving plate and the base plate with respect to one another, the locking arm member having a cam interface surface, the cam interface surface having a dwell portion and a raised portion;
    at least one rolling member located in a recess in at least one of the moving plate and the base plate; and
    a cam member having a first end,
    wherein the first end of the cam member interfaces with the at least one rolling member and the cam interface surface via direct contact,
    wherein the at least one locking arm member is configured to be moved into and out of a locking position by actuating the cam member,
    wherein the rolling member is configured to move in a radially inward direction when moving the locking arm member into an unlocking position, and
    wherein the at least one locking arm member is configured to be moved into and out of the locking position by actuating the cam member such that the cam member engages an abutment surface of the locking arm member so as to force the locking arm member to move into an unlocking position and the rolling member becomes free to move in the radially inward direction.

12. The recliner mechanism of claim 11 wherein the at least one rolling member has a circular cross section.

13. The recliner mechanism of claim 11 wherein the at least one rolling member has a cylinder-shaped member, and wherein at least a portion of the cylinder-shaped member is constrained in the recess.

14. The recliner mechanism of claim 11 wherein the at least one rolling member is a spherical member, and wherein a portion of the spherical member is constrained between the moving plate and the base plate.

15. The recliner mechanism of claim 11 wherein the at least one locking arm member is movable on a non-linear, arcuate path for locking the moving plate and the base plate.

16. The recliner mechanism of claim 11 wherein the at least one rolling member is a pair of rolling members and the at least one locking arm member is a pair of locking arm members.

17. A recliner mechanism comprising:
a first member rotatably supported with respect to a second member;
an at least one pawl movably located between the first member and the second member for locking a position of the first member and the second member with respect to one another, the at least one pawl being located in a slot in the first member;
a disc at least partially located in a slot in a guide, the guide being located between the first member and the second member, wherein the disc is located to operate between a cam and the at least one pawl to remove looseness of the at least one pawl within the slot in the first member;
an inner member connected to the cam and having a central passage for receiving an actuating member, the inner member being configured to connect the first and second members; and
a cam return spring located external to the first and second members, the cam return spring being connected to the inner member, and
wherein the at least one pawl is configured to be moved into and out of a locking position by actuating the cam.

18. The recliner mechanism of claim 17 further comprising an inner ring member for establishing a range of relative motion between the first member and the second member.

19. The recliner mechanism of claim 18 wherein the first member and the second member have a plurality of stop members formed therein for engagement with a portion of the inner ring member to define limits of travel of the recliner mechanism.

20. The recliner mechanism of claim 17 wherein one of the first member and the second member have a toothed portion for engagement with the at least one pawl.

21. The recliner mechanism of claim 17, wherein the inner member is a central bushing member for connecting the first and second members, the central bushing member having an internal formed surface for engaging the actuating member for actuating the recliner mechanism.

22. The recliner mechanism of claim 17 further comprising a recliner return member which biases the first and second members in a first direction.

23. The recliner mechanism of claim 22 wherein the recliner mechanism further comprises an upper bracket and a lower bracket which are mounted on opposite sides of the first and second members, and wherein the recliner return member is a coil spring having a first end connected to the upper bracket and a second end fixed to the lower bracket such that the first end of the recliner return member biases the first member to rotate in the first direction with respect to the second member.

24. The recliner mechanism of claim 17 wherein the cam return spring is a coil spring.

25. The recliner mechanism of claim 21 wherein the internal formed surface of the central bushing member includes an inner keyed contour passage.

26. The recliner mechanism of claim 21 wherein the recliner mechanism is laser welded to a frame member, the laser welding being configured in a shape of a "C" or in a shape of a "C" partially surrounding a straight line.

27. The recliner mechanism of claim 17 wherein the guide is a flat plate member located between the first and second members.

28. The recliner mechanism of claim 27 wherein the at least one pawl comprises first and second pawls, the guide includes a second slot, and a second disc is at least partially located in the second slot.

29. The recliner mechanism of claim 17 wherein, when moving into an unlocking position of the pawl, the cam is configured to contact an abutment surface of the pawl so as to force the pawl to move and the disc becomes free to move in a radially inward direction.

* * * * *